United States Patent
Oguchi et al.

(10) Patent No.: US 11,005,133 B2
(45) Date of Patent: May 11, 2021

(54) SHEET MANUFACTURING APPARATUS AND CONTROL METHOD FOR SHEET MANUFACTURING APPARATUS

(71) Applicant: SEIKO EPSON CORPORATION, Tokyo (JP)

(72) Inventors: Yuki Oguchi, Nagano (JP); Masahide Nakamura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 121 days.

(21) Appl. No.: 16/328,337

(22) PCT Filed: Aug. 4, 2017

(86) PCT No.: PCT/JP2017/028466
§ 371 (c)(1),
(2) Date: Feb. 26, 2019

(87) PCT Pub. No.: WO2018/043034
PCT Pub. Date: Mar. 8, 2018

(65) Prior Publication Data
US 2019/0270220 A1  Sep. 5, 2019

(30) Foreign Application Priority Data
Aug. 31, 2016 (JP) .............................. JP2016-169472

(51) Int. Cl.
| | | |
|---|---|---|
| *D21F 7/06* | (2006.01) | |
| *H01M 50/124* | (2021.01) | |
| *B27N 3/18* | (2006.01) | |
| *B65H 20/04* | (2006.01) | |
| *D04H 1/60* | (2006.01) | |
| *D04H 1/732* | (2012.01) | |
| *D21B 1/06* | (2006.01) | |
| *B32B 7/12* | (2006.01) | |
| *B32B 15/09* | (2006.01) | |
| *B32B 15/20* | (2006.01) | |
| *B32B 27/08* | (2006.01) | |
| *B32B 27/36* | (2006.01) | |
| *C22C 21/00* | (2006.01) | |
| *B29L 7/00* | (2006.01) | |

(52) U.S. Cl.
CPC ............ *H01M 50/124* (2021.01); *B27N 3/18* (2013.01); *B32B 7/12* (2013.01); *B32B 15/09* (2013.01); *B32B 15/20* (2013.01); *B32B 27/08* (2013.01); *B32B 27/36* (2013.01); *B65H 20/04* (2013.01); *C22C 21/00* (2013.01); *D04H 1/60* (2013.01); *D04H 1/732* (2013.01); *D21B 1/063* (2013.01); *D21F 7/06* (2013.01); *B29L 2007/008* (2013.01); *B32B 2307/31* (2013.01); *B32B 2457/10* (2013.01); *H01M 2220/20* (2013.01)

(58) Field of Classification Search
USPC ........................................................ 162/261
See application file for complete search history.

(56) References Cited

U.S. PATENT DOCUMENTS 8,882,965 B2    11/2014  Yamagami et al.
2016/0273164 A1*  9/2016  Omagari ................. D04H 1/00

FOREIGN PATENT DOCUMENTS

| JP | 2012-140738 A | 7/2012 |
|---|---|---|
| JP | 2012-144819 A | 8/2012 |
| JP | 2016-098472 A | 5/2016 |
| JP | 2016-172363 A | 9/2016 |
| JP | 2017-014661 A | 1/2017 |

* cited by examiner

*Primary Examiner* — Mark Halpern
(74) *Attorney, Agent, or Firm* — Global IP Counselors, LLP

(57) ABSTRACT

A sheet manufacturing apparatus includes a second web forming unit that processes fibers into a web shape, a sheet forming unit that pinches and transports a second web processed into the web shape by the second web forming unit, and a control unit that controls at least any of a pressing state and a transport state in the sheet forming unit. The control unit causes the second web to pass through a nip unit by controlling at least any of a transport speed of the sheet forming unit, a nip pressure of the sheet forming unit, and a nip width of the sheet forming unit depending on a position of a leading edge of the second web with respect to the nip unit in which the sheet forming unit pinches the second web.

12 Claims, 8 Drawing Sheets

SHEET MANUFACTURING APPARATUS AND CONTROL METHOD FOR SHEET MANUFACTURING APPARATUS

CROSS-REFERENCE TO RELATED APPLICATIONS

This application is a U.S. National stage application of International Patent Application No. PCT/JP2017/028466, filed on Aug. 4, 2017, which claims priority under 35 U.S.C. § 119(a) to Japanese Patent Application No. 2016-169472, filed in Japan on Aug. 31, 2016. The entire disclosure of Japanese Patent Application No. 2016-169472 is hereby incorporated herein by reference.

TECHNICAL FIELD

The present invention relates to a sheet manufacturing apparatus and a control method for a sheet manufacturing apparatus.

BACKGROUND ART

Acquiring a formation of a sheet shape or a film shape by accumulating a substance of a fibrous shape and causing a binding force between the accumulated fibers has been performed for a long time. A typical example is exemplified by manufacturing of paper by papermaking (screening) using water. Generally, paper manufactured by the papermaking method mostly has a structure in which fibers of cellulose derived from, for example, wood are interwoven with each other and are partially bound to each other by a binder (a paper strengthening agent (starch glue, water-soluble resin, or the like)) (for example, refer to Japanese Unexamined Patent Application Publication No. 2012-140738).

However, since the papermaking method is of a wet type, a large amount of water needs to be used. In addition, dehydration, drying, and the like are needed after paper is formed. Thus, the amount of energy and time consumed is significantly large. In addition, the used water needs to be appropriately processed as waste water. Accordingly, it is difficult to meet the current demands of energy conservation, environmental protection, and the like. In addition, an apparatus that is used in the papermaking method mostly needs large scale utilities such as water, electric power, and a waste water facility, and it is difficult to reduce the size of the apparatus. From such a viewpoint, a method referred to as a dry type method that does not or barely uses water is expected as a paper manufacturing method replacing the papermaking method (for example, refer to Japanese Unexamined Patent Application Publication No. 2012-144819).

Generally, a step of manufacturing a sheet such as paper includes a mechanism that transports a web formed by accumulating fibers or the like and a sheet acquired by pressing (heating) the web. For example, the web or the sheet is transported by mounting the web or the sheet on a belt and moving the belt, or by pinching the web or the sheet with a pair of rollers and rotating the rollers.

In a case of finishing (or stopping) the manufacturing of the sheet, the apparatus may be stopped in a state where all sheets in the manufacturing apparatus are discharged from the manufacturing apparatus, so that the sheets are not left in the manufacturing apparatus. In such a case, in a case where the manufacturing of the sheet is initiated (or resumed) subsequently, the leading edge of the web or the sheet formed may have an insufficient thickness.

In a case where the web or the sheet having an insufficient thickness at its leading edge is transported, the web is not easily separated from the belt, is not easily pinched by the rollers, or is easily wound onto the rollers. Thus, the web or the sheet is easily stuck (a so-called jam) in the apparatus.

SUMMARY

An object of the present invention is to inhibit a jam of a web or a sheet in a case where manufacturing of a sheet by a sheet manufacturing apparatus is initiated.

In order to resolve the above problem, the present invention includes a processing unit that processes fibers into a web shape, a roller unit that pinches and transports processed matter processed into the web shape by the processing unit, and a control unit that controls at least any of a pressing state and a transport state in the roller unit, in which the control unit causes the processed matter to pass in a nip unit by controlling at least any of a transport speed of the roller unit, a nip pressure of the roller unit, and a nip width of the roller unit depending on a position of a leading edge of the processed matter with respect to the nip unit in which the roller unit pinches the processed matter.

According to the present invention, the leading edge of the processed matter in a web shape can smoothly pass through the nip unit in a case where manufacturing of a sheet is initiated. Thus, the occurrence of a jam in a manufacturing step of the sheet can be inhibited.

In addition, in the present invention, the processing unit transports the processed matter at a speed corresponding to the transport speed at which the processed matter is transported in the roller unit.

According to the present invention, the processed matter in a web shape is transported at an appropriate speed. Thus, in the manufacturing step of the sheet, the occurrence of a jam caused by a difference in transport speed can be more effectively inhibited.

In addition, in the present invention, the processing unit includes a transfer unit that transfers the processed matter to the roller unit based on control of the control unit, and the control unit transfers, by the transfer unit, the processed matter at a first speed at a time of a normal operation and transfers the processed matter at a second speed that is a speed lower than the first speed, in a case where the leading edge of the processed matter enters the nip unit.

According to the present invention, the processed matter can smoothly pass through the nip unit by sending the processed matter in a web shape to the nip unit at a low speed in a case where manufacturing of the sheet is initiated. In addition, at a time of a normal operation of manufacturing the sheet, the processed matter is transported at a higher speed, and manufacturing efficiency can be increased. Accordingly, a decrease in the manufacturing efficiency of the sheet can be inhibited, and a jam in the manufacturing step of the sheet can be inhibited.

In addition, in the present invention, the control unit transfers the processed matter at a speed higher than the second speed by the transfer unit in a case where the leading edge of the processed matter is away by a predetermined distance or longer from the nip unit.

According to the present invention, the manufacturing efficiency of the sheet can be increased by increasing the transport speed while the leading edge of the processed matter in a web shape is not in contact with the nip unit.

In addition, the present invention further includes a tension roller that imparts a tensile force to the processed matter, in which the control unit separates the tension roller from the processed matter depending on the position of the leading edge of the processed matter.

According to the present invention, in a case where the leading edge of the processed matter in a web shape moves, the tension roller is separated. At the time of the normal operation of manufacturing the sheet, looseness of the processed matter in a web shape can be removed by the tension roller. The occurrence of a jam can be effectively inhibited.

In addition, in the present invention, the roller unit includes a heating roller that heats the processed matter.

According to the present invention, a state where a jam does not easily occur can be implemented by adjusting a transport speed, a nip pressure, or a nip width of the heating roller heating the processed matter in a web shape.

In addition, in the present invention, the heating roller includes rollers as a pair, and at least one of the rollers has elasticity and has a nip width that changes depending on a nip pressure.

According to the present invention, the nip width can be adjusted by adjusting the nip pressure of the roller. Accordingly, by adjusting the nip pressure, a phenomenon in which the leading edge of the processed matter in a web shape is wound onto the rollers can be prevented, and the occurrence of a jam can be effectively inhibited.

In addition, in the present invention, the nip pressure of the heating roller is capable of being adjusted by control of the control unit.

According to the present invention, the occurrence of a jam can be inhibited by adjusting the nip pressure of the heating roller.

In addition, the present invention further includes a paper guide on a downstream side of the heating roller in a transport direction of the processed matter, in which the control unit controls a gap distance between the paper guide and the heating roller depending on the position of the leading edge of the processed matter.

According to the present invention, in a case where the heating roller expands along with an increase in temperature, interference of the heating roller with the paper guide can be prevented.

In addition, in the present invention, the processing unit includes a defibrating unit that defibrates a raw material including the fibers, a mixing unit that mixes the fibers included in defibrated matter defibrated by the defibrating unit with resin, and a web forming unit that forms a web by accumulating a mixture mixed by the mixing unit, transfers the web as the processed matter toward the roller unit, and sets an amount of the resin included in a part within a predetermined distance from a leading edge of the web to be smaller than the amount of the resin in other parts in the web based on control of the control unit.

According to the present invention, winding of the leading edge of the processed matter onto the heating roller, the occurrence of wrinkles, distortions, and the like can be inhibited by decreasing the amount of resin included in the leading edge of the processed matter. Accordingly, the occurrence of a jam can be effectively inhibited.

In addition, in the present invention, the defibrating unit defibrates the raw material in an atmosphere, the mixing unit mixes the fibers with the resin in the atmosphere, the web forming unit includes a mesh belt and forms the web by dropping and accumulating the mixture on the mesh belt, and the roller unit forms a sheet by pressing and heating the web.

According to the present invention, in a dry type sheet manufacturing apparatus that manufactures the sheet by defibrating the raw material in the atmosphere and mixing the defibrated matter with resin in the atmosphere, the occurrence of a jam in a case where the leading edge of the processed matter passes through the nip unit can be inhibited.

In addition, in order to resolve the above problem, the present invention controls a sheet manufacturing apparatus including a processing unit that processes fibers into a web shape, and a roller unit that pinches and transports processed matter processed into the web shape by the processing unit, in which a control unit causes the processed matter to pass in a nip unit by controlling at least any of a transport speed of the roller unit, a nip pressure of the roller unit, and a nip width of the roller unit depending on a position of a leading edge of the processed matter with respect to the nip unit in which the roller unit pinches the processed matter.

According to the present invention, the leading edge of the processed matter in a web shape can smoothly pass through the nip unit in a case where manufacturing of a sheet is initiated. Thus, the occurrence of a jam in a manufacturing step of the sheet can be inhibited.

The present invention can be implemented in various forms other than the sheet manufacturing apparatus and the control method for the sheet manufacturing apparatus described above. For example, a system that includes the sheet manufacturing apparatus can be configured. In addition, a program executed by a computer may be implemented in order to execute the control method for the sheet manufacturing apparatus. In addition, the control method can be implemented in the form of a recording medium on which the program is recorded, a server apparatus that distributes the program, a transmission medium for transmitting the program, a data signal in which the program is implemented in a carrier wave, or the like.

DESCRIPTION OF EMBODIMENTS

Hereinafter, an exemplary embodiment of the present invention will be described in detail using the drawings. The embodiment described below does not limit the content of the invention disclosed in the claims. In addition, not all configurations described below are essential constituents of the present invention.

Figure 1:
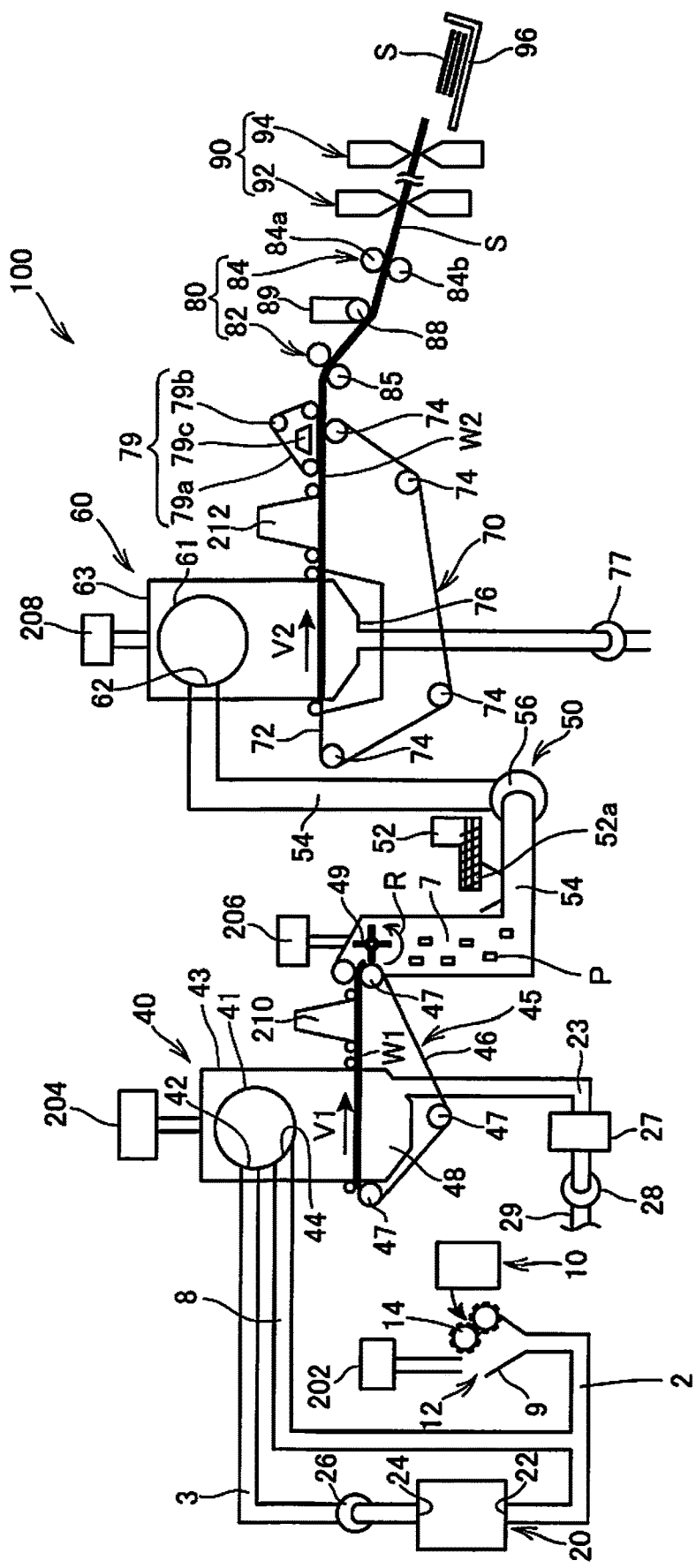
FIG. 1 is a schematic diagram illustrating a configuration of a sheet manufacturing apparatus.

FIG. 1 is a schematic diagram illustrating a configuration of a sheet manufacturing apparatus according to the embodiment.

A sheet manufacturing apparatus 100 according to the present embodiment is an apparatus suitable for manufacturing new paper by turning old used paper such as confidential paper as a raw material into fibers using dry type defibration and then, performing pressing, heating, and cutting. By mixing various additives to the raw material that has been turned into fibers, the binding strength or the brightness of paper products may be improved, or functions such as color, scent, and flame retardance may be added, depending on the application. In addition, molding by controlling the density, the thickness, and the shape of the paper enables paper of various thicknesses and sizes such as A4 or A3 office paper and business card paper to be manufactured depending on the application.

As illustrated in FIG. 1, the sheet manufacturing apparatus 100 includes a supply unit 10, a grinding unit 12, a defibrating unit 20, a selecting unit 40, a first web forming unit 45, a rotating body 49, a mixing unit 50, an accumulating unit 60, a second web forming unit 70, a transport unit 79, a sheet forming unit 80, and a cutting unit 90.

In addition, the sheet manufacturing apparatus 100 includes humidifying units 202, 204, 206, 208, 210, and 212 for humidifying the raw material and/or humidifying a space in which the raw material moves. Specific configurations of the humidifying units 202, 204, 206, 208, 210, and 212 are not limited and are exemplified by a steam type, a vaporization type, a warm air vaporization type, and an ultrasonic type.

In the present embodiment, the humidifying units 202, 204, 206, and 208 are configured with vaporization type or warm air vaporization type humidifiers. That is, the humidifying units 202, 204, 206, and 208 include a filter (not illustrated) through which water permeates, and supply humidified air having increased humidity by causing air to pass through the filter.

In addition, in the present embodiment, the humidifying unit 210 and the humidifying unit 212 are configured with ultrasonic type humidifiers. That is, the humidifying units 210 and 212 include a vibrating unit (not illustrated) that atomizes water, and supply mist generated by the vibrating unit.

The supply unit 10 supplies the raw material to the grinding unit 12. The raw material from which the sheet manufacturing apparatus 100 manufactures a sheet may be any raw material including fibers. The raw material is exemplified by, for example, paper, pulp, a pulp sheet, fabric including non-woven fabric, or cloth. In the present embodiment, a configuration in which the sheet manufacturing apparatus 100 uses old paper as the raw material is illustrated. The present embodiment is configured such that the supply unit 10 includes a stacker that accumulates old paper in an overlaid manner, and old paper is sent to the grinding unit 12 from the stacker by the operation of a paper feeding motor 315 (FIG. 2) described below.

The grinding unit 12 cuts (grinds) the raw material supplied by the supply unit 10 into ground pieces using a grinding blade 14. The grinding blade 14 cuts the raw material in a gas such as in the atmosphere (in the air). The grinding unit 12 includes, for example, a pair of grinding blades 14 that cut the raw material pinched therebetween, and a drive unit that rotates the grinding blades 14. The grinding unit 12 can have the same configuration as a so-called shredder. The shape and the size of the ground piece are not limited and may be any shape and any size suitable for a defibration process in the defibrating unit 20. For example, the grinding unit 12 cuts the raw material into paper pieces, each of which has a size of 1 to a few cm or less on each of its four edges.

The grinding unit 12 includes a chute (hopper) 9 that receives falling ground pieces cut by the grinding blades 14. For example, the chute 9 has a tapered shape that has a gradually decreasing width in a flow direction (traveling direction) of the ground pieces. Thus, the chute 9 can receive many ground pieces. A pipe 2 that communicates with the defibrating unit 20 is connected to the chute 9. The pipe 2 forms a transport path for transporting the raw material (ground pieces) cut by the grinding blades 14 to the defibrating unit 20. The ground pieces are collected by the chute 9 and are transferred (transported) to the defibrating unit 20 through the pipe 2.

Humidified air is supplied by the humidifying unit 202 to the chute 9 included in the grinding unit 12 or to the vicinity of the chute 9. Accordingly, a phenomenon in which the ground matter cut by the grinding blades 14 is adsorbed on the inner surface of the chute 9 or the pipe 2 by static electricity can be inhibited. In addition, the ground matter cut by the grinding blades 14 is transferred to the defibrating unit 20 along with the humidified (high humidity) air. Thus, the effect of inhibiting attachment of defibrated matter inside the defibrating unit 20 can also be expected. In addition, the humidifying unit 202 may be configured to supply humidified air to the grinding blades 14 and remove the electric charge of the raw material supplied by the supply unit 10. In addition, the electric charge may be removed using an ionizer along with the humidifying unit 202.

The defibrating unit 20 performs a defibration process on the raw material (ground pieces) cut by the grinding unit 12 and generates defibrated matter. The "defibration" means that the raw material (matter to be defibrated) of a plurality of bound fibers is separated fiber by fiber. The defibrating unit 20 has a function of separating a substance such as resin particles, ink, toner, or an antismear agent attached to the raw material from fiber.

The raw material that has passed through the defibrating unit 20 is referred to as "defibrated matter". The "defibrated matter" may include not only the separated fibers of the defibrated matter but also resin (resin for binding the plurality of fibers together) particles separated from the fibers in the case of separating the fibers, colorant such as ink and toner, and additives such as an antismear material, and a paper strengthening agent. The shape of the separated defibrated matter is a string shape or a ribbon shape. The separated defibrated matter may be present in a non-tangled state (independent state) with other separated fibers or may be present in a tangled state (a state where a so-called "lump" is formed) with other separated defibrated matter as a clump shape.

The defibrating unit 20 performs dry type defibration. The dry type refers to a process such as defibration performed in a gas such as in the atmosphere (in the air) and not in a liquid. The present embodiment is configured such that the defibrating unit 20 uses impeller milling. Specifically, the defibrating unit 20 includes a rotor (not illustrated) that rotates at a high speed, and a liner (not illustrated) that is positioned on the outer circumference of a roller. The ground pieces ground by the grinding unit 12 are pinched and defibrated between the rotor and the liner of the defibrating unit 20. The defibrating unit 20 generates an airflow by rotating the rotor. This airflow enables the defibrating unit 20 to draw the ground pieces, which are the raw material, from the pipe 2 and transport the defibrated matter to a discharge port 24. The defibrated matter is sent to a pipe 3 from the discharge port 24 and is transferred to the selecting unit 40 through the pipe 3.

In such a manner, the defibrated matter generated by the defibrating unit 20 is transported to the selecting unit 40 from the defibrating unit 20 by the airflow generated by the defibrating unit 20. Furthermore, in the present embodiment, the sheet manufacturing apparatus 100 includes a defibrating unit blower 26 that is an airflow generating device. The defibrated matter is transported to the selecting unit 40 by an airflow generated by the defibrating unit blower 26. The defibrating unit blower 26 is attached to the pipe 3, draws air along with the defibrated matter from the defibrating unit 20, and blows air to the selecting unit 40.

The selecting unit 40 includes an introduction port 42 into which the defibrated matter defibrated by the defibrating unit 20 flows from the pipe 3 along with the airflow. The selecting unit 40 selects the defibrated matter introduced into the introduction port 42 by the length of fiber. Specifically, the selecting unit 40 selects the defibrated matter of a predetermined size or less as first selected matter and the defibrated matter larger than the first selected matter as second selected matter from the defibrated matter defibrated by the defibrating unit 20. The first selected matter includes fibers or particles or the like, and the second selected matter includes, for example, large fibers, non-defibrated pieces (ground pieces that are not sufficiently defibrated), and a clump into which defibrated fibers cohere or are tangled.

In the present embodiment, the selecting unit 40 includes a drum unit (sieve unit) 41 and a housing unit (cover unit) 43 that contains the drum unit 41.

The drum unit 41 is a cylindrical sieve that is rotationally driven by a motor. The drum unit 41 includes a net (a filter or a screen) and functions as a sieve (sifter). By the mesh of the net, the drum unit 41 selects the first selected matter smaller than the size of the mesh (opening) of the net and the second selected matter larger than the mesh of the net. For example, a metal net, expanded metal made by stretching a notched metal plate, or perforated metal made by forming holes in a metal plate using a press or the like can be used as the net of the drum unit 41.

The defibrated matter introduced into the introduction port 42 is sent into the drum unit 41 along with the airflow, and the first selected matter falls downward from the mesh of the net of the drum unit 41 by rotation of the drum unit 41. The second selected matter that cannot pass through the mesh of the net of the drum unit 41 is caused to flow and be guided to the discharge port 44 by an airflow that flows into the drum unit 41 from the introduction port 42, and is sent to a pipe 8.

The pipe 8 connects the inside of the drum unit 41 and the pipe 2. The second selected matter that flows through the pipe 8 flows through the pipe 2 along with the ground pieces ground by the grinding unit 12 and is guided to an introduction port 22 of the defibrating unit 20. Accordingly, the second selected matter is returned to the defibrating unit 20 and is subjected to the defibration process.

In addition, the first selected matter selected by the drum unit 41 scatters in the air through the mesh of the net of the drum unit 41 and falls toward a mesh belt 46 of the first web forming unit 45 that is positioned below the drum unit 41.

The first web forming unit 45 includes the mesh belt 46, a stretching roller 47, and a drawing unit 48. The mesh belt 46 is a belt of an endless shape, is suspended on three stretching rollers 47, and is transported in a direction illustrated by an arrow in the drawing by the motion of the stretching rollers 47. The surface of the mesh belt 46 is configured with a net in which openings of a predetermined size are lined up. In the first selected matter falling from the selecting unit 40, minute particles of a size that passes through the mesh of the net fall below the mesh belt 46. Fibers of a size that cannot pass through the mesh of the net are accumulated on the mesh belt 46 and are transported in the direction of the arrow along with the mesh belt 46. The minute particles falling from the mesh belt 46 include relatively small or less dense defibrated matter (resin particles, colorant, additives, and the like) and are removed matter that is not used in manufacturing of a sheet S by the sheet manufacturing apparatus 100.

The mesh belt 46 moves at a constant speed V1 during a normal operation of manufacturing the sheet S. The normal operation is an operation except for execution of a start control for starting the sheet manufacturing apparatus 100 from a stop state and a stop control for stopping the sheet manufacturing apparatus 100. In addition, the normal operation refers to a period in which the sheet manufacturing apparatus 100 manufactures the sheet S of desired quality.

Accordingly, the defibrated matter subjected to the defibration process by the defibrating unit 20 is selected as the first selected matter and the second selected matter by the selecting unit 40, and the second selected matter is returned to the defibrating unit 20. In addition, the removed matter is removed from the first selected matter by the first web forming unit 45. The residue after the removed matter is removed from the first selected matter is a material suitable for manufacturing of the sheet S. This material is accumulated on the mesh belt 46 and forms a first web W1.

The drawing unit 48 draws air from a space below the mesh belt 46. The drawing unit 48 is connected to a dust collecting unit 27 through a pipe 23. The dust collecting unit 27 is a filter type or cyclone type dust collecting device and separates minute particles from the airflow. A capturing blower 28 is installed downstream of the dust collecting unit 27. The capturing blower 28 draws air from the dust collecting unit 27. In addition, air discharged by the capturing blower 28 is discharged outside the sheet manufacturing apparatus 100 through a pipe 29.

In such a configuration, air is drawn by the capturing blower 28 from the drawing unit 48 through the dust collecting unit 27. In the drawing unit 48, minute particles passing through the mesh of the net of the mesh belt 46 are drawn along with air and are sent to the dust collecting unit 27 through the pipe 23. The dust collecting unit 27 separates minute particles passing through the mesh belt 46 from the airflow and accumulates the minute particles.

Accordingly, fibers acquired after removing the removed matter from the first selected matter are accumulated on the mesh belt 46 and form the first web W1. The drawing performed by the capturing blower 28 promotes formation of the first web W1 on the mesh belt 46 and causes the removed matter to be quickly removed.

Humidified air is supplied to a space including the drum unit 41 by the humidifying unit 204. This humidified air humidifies the first selected matter inside the selecting unit 40. Accordingly, attachment of the first selected matter to the mesh belt 46 by static electricity can be weakened, and the first selected matter can be easily peeled from the mesh belt 46. Furthermore, attachment of the first selected matter to the inner wall of the rotating body 49 or the housing unit 43 by static electricity can be inhibited. In addition, the removed matter can be efficiently drawn by the drawing unit 48.

In the sheet manufacturing apparatus 100, a configuration in which the first selected matter and the second selected matter are selected and separated is not limited to the selecting unit 40 including the drum unit 41. For example, a configuration in which the defibrated matter subjected to the defibration process by the defibrating unit 20 is classified by a classifier may be employed. For example, a cyclone classifier, an elbow jet classifier, or an eddy classifier can be used as the classifier. In a case where such a classifier is used, the first selected matter and the second selected matter can be selected and separated. Furthermore, a configuration in which the removed matter including relatively small or less dense defibrated matter (resin particles, colorant, additives, and the like) is separated and removed can be implemented by the classifier. For example, a configuration in which minute particles included in the first selected matter are removed from the first selected matter by the classifier may be used. In this case, for example, a configuration in which the second selected matter is returned to the defibrating unit 20, the removed matter is collected by the dust collecting unit 27, and the first selected matter except for the removed matter is sent to a pipe 54 can be used.

In the transport path of the mesh belt 46, air including mist is supplied on the downstream side of the selecting unit 40 by the humidifying unit 210. The mist that is minute particles of water generated by the humidifying unit 210 falls toward the first web W1 and supplies moisture to the first web W1. Accordingly, the amount of moisture included in the first web W1 is adjusted, and attachment or the like of the fibers to the mesh belt 46 by static electricity can be inhibited.

The sheet manufacturing apparatus 100 includes the rotating body 49 that divides the first web W1 accumulated on the mesh belt 46. The first web W1 is peeled from the mesh belt 46 and is divided by the rotating body 49 at a position where the mesh belt 46 is folded by the stretching rollers 47.

The first web W1 is a soft material into which fibers are accumulated in a web shape. The rotating body 49 separates the fibers of the first web W1 and processes the first web W1 to be in a state where resin is easily mixed by a mixing unit 50 described below.

While the configuration of the rotating body 49 is not limited, the rotating body 49 in the present embodiment can have a rotating vane shape that includes a vane of a plate shape and rotates. The rotating body 49 is arranged at a position where the first web W1 peeled from the mesh belt 46 comes into contact with the vane. By rotation (for example, rotation in a direction illustrated by an arrow R in the drawing) of the rotating body 49, the vane hits and divides the first web W1 that is peeled from the mesh belt 46 and transported, and a subdivided body P is generated.

It is preferable that the rotating body 49 be installed at a position where the vane of the rotating body 49 does not hit the mesh belt 46. For example, the gap between the tip end of the vane of the rotating body 49 and the mesh belt 46 can be set to be greater than or equal to 0.05 mm and less than or equal to 0.5 mm. In this case, the first web W1 can be efficiently divided by the rotating body 49 without damaging the mesh belt 46.

The subdivided body P divided by the rotating body 49 falls inside a pipe 7 and is transferred (transported) to the mixing unit 50 by an airflow that flows inside the pipe 7.

In addition, humidified air is supplied to a space including the rotating body 49 by the humidifying unit 206. Accordingly, a phenomenon in which fiber is adsorbed to the inside the pipe 7 or the vane of the rotating body 49 by static electricity can be inhibited. In addition, since high humidity air is supplied to the mixing unit 50 through the pipe 7, the effect of static electricity can be inhibited in the mixing unit 50.

The mixing unit 50 includes an additive supply unit 52 that supplies an additive including resin, a pipe 54 that communicates with the pipe 7 and where the airflow including the subdivided body P flows, and a mixing blower 56.

As described above, the subdivided body P is fiber acquired by removing the removed matter from the first selected matter that has passed through the selecting unit 40. The mixing unit 50 mixes the additive including resin with the fibers constituting the subdivided body P.

In the mixing unit 50, an airflow is generated by the mixing blower 56, and the subdivided body P and the additive are mixed and transported in the pipe 54. In addition, the subdivided body P is separated into finer fibrous shapes while flowing inside the pipe 7 and the pipe 54.

The additive supply unit 52 (resin containing unit) is connected to a resin cartridge (not illustrated) that accumulates the additive, and supplies the additive inside the resin cartridge to the pipe 54. The additive cartridge may be configured to be attachable and detachable with respect to the additive supply unit 52. In addition, a configuration in which the additive cartridge is refilled with the additive may be included. The additive supply unit 52 temporarily retains the additive consisting of minute powder or minute particles inside the resin cartridge. The additive supply unit 52 includes a discharge unit 52a (resin supply unit) that sends the temporarily retained additive to the pipe 54. The discharge unit 52a includes a feeder (not illustrated) that sends the additive retained in the additive supply unit 52 to the pipe 54, and a shutter (not illustrated) that opens and closes a duct connecting the feeder and the pipe 54. In a case where the shutter is closed, the duct or an opening that connects the discharge unit 52a and the pipe 54 is closed, and the supply of the additive to the pipe 54 from the additive supply unit 52 is stopped.

In a state where the feeder of the discharge unit 52a does not operate, the additive is not supplied to the pipe 54 from the discharge unit 52a. However, for example, in a case where a negative pressure is generated in the pipe 54, there is a possibility that the additive flows to the pipe 54 even in a case where the feeder of the discharge unit 52a is stopped. Such a flow of additive can be securely blocked by closing the discharge unit 52a.

The additive supplied by the additive supply unit 52 includes resin for binding a plurality of fibers. The resin is thermoplastic resin or thermosetting resin and is, for example, AS resin, ABS resin, polypropylene, polyethylene, polyvinyl chloride, polystyrene, acrylic resin, polyester resin, polyethylene terephthalate, polyphenylene ether, polybutylene terephthalate, nylon, polyamide, polycarbonate, polyacetal, polyphenylene sulfide, or polyetheretherketone. Such resin may be used alone or may be appropriately mixed and used. That is, the additive may include a single substance, may be a mixture, or may include particles of a plurality of types, each of which is configured with a single or a plurality of substances. In addition, the additive may have a fibrous shape or a powdery shape.

The resin included in the additive is melted by heating and binds a plurality of fibers together. Accordingly, in a state where the resin is mixed with the fibers, and heating is not performed to a temperature at which the resin is melted, the fibers are not bound together.

In addition, the additive supplied by the additive supply unit 52 may include not only the resin binding the fibers but also colorant for coloring the fibers, a coherence inhibitor for inhibiting coherence of the fibers or coherence of the resin, and a flame retardant for making the fibers or the like not easily flammable depending on the type of sheet to be manufactured. In addition, the additive that does not include colorant may be colorless or thin such that the additive looks colorless, or may be white.

By the airflow generated by the mixing blower 56, the subdivided body P falling in the pipe 7 and the additive supplied by the additive supply unit 52 are drawn into the pipe 54 and pass through the mixing blower 56. The airflow generated by the mixing blower 56 and/or the effect of a rotating unit such as the vane included in the mixing blower 56 mixes the fibers constituting the subdivided body P with the additive, and the mixture (a mixture of the first selected matter and the additive) is transferred to the accumulating unit 60 through the pipe 54.

A mechanism that mixes the first selected matter with the additive is not particularly limited and may be such that stirring is performed by a vane that rotates at a high speed, rotation of a container is used such as a V type mixer, or such a mechanism is installed before or after the mixing blower 56.

The accumulating unit 60 introduces the mixture, which has passed through the mixing unit 50, from an introduction port 62, separates the tangled defibrated matter (fibers), and drops the separated fibers in a scattering manner in the air. Furthermore, in a case where the resin of the additive supplied from the additive supply unit 52 has a fibrous shape, the accumulating unit 60 separates the tangled resin. Accordingly, the accumulating unit 60 can uniformly accumulate the mixture on the second web forming unit 70 (web forming unit).

The accumulating unit 60 includes a drum unit 61 and a housing unit (cover unit) 63 that contains the drum unit 61. The drum unit 61 is a cylindrical sieve that is rotationally driven by a motor. The drum unit 61 includes a net (a filter or a screen) and functions as a sieve (sifter). By the mesh of the net, the drum unit 61 causes a fiber or a particle smaller than the mesh (opening) of the net to pass and fall from the drum unit 61. For example, the configuration of the drum unit 61 is the same as the configuration of the drum unit 41.

The "sieve" of the drum unit 61 may not have a function of selecting specific target matter. That is, the "sieve" that is used as the drum unit 61 means that a net is included. The drum unit 61 may drop the whole mixture introduced in the drum unit 61.

The second web forming unit 70 is arranged below the drum unit 61. The second web forming unit 70 forms a second web W2 (a web or processed matter of a web shape) by accumulating passed matter that has passed through the accumulating unit 60. The second web forming unit 70 includes, for example, a mesh belt 72 (transfer unit), a stretching roller 74, and a suction mechanism 76.

The mesh belt 72 is a belt of an endless shape, is suspended on a plurality of stretching rollers 74, and is transported in a direction illustrated by an arrow in the drawing by the motion of the stretching rollers 74. The mesh belt 72 is made of, for example, metal, resin, fabric, or non-woven fabric. The surface of the mesh belt 72 is configured with a net in which openings of a predetermined size are lined up. Among the fibers or particles falling from the drum unit 61, minute particles of a size that passes through the mesh of the net fall below the mesh belt 72. Fibers of a size that cannot pass through the mesh of the net are accumulated on the mesh belt 72 and are transported in the direction of the arrow along with the mesh belt 72. In addition, the movement speed of the mesh belt 72 can be controlled by a control unit 150 (FIG. 4) described below. The mesh belt 72 moves at a constant speed V2 during the normal operation of manufacturing the sheet S. The normal operation is the same as described above.

The mesh of the net of the mesh belt 72 can have a minute size that does not cause most of the fibers or particles falling from the drum unit 61 to pass through.

The suction mechanism 76 is disposed below the mesh belt 72 (on the opposite side from the accumulating unit 60 side). The suction mechanism 76 includes a suction blower 77. A drawing force of the suction blower 77 can cause the suction mechanism 76 to generate an airflow directed downward (an airflow directed toward the mesh belt 72 from the accumulating unit 60).

The mixture that is scattered in the air by the accumulating unit 60 is drawn onto the mesh belt 72 by the suction mechanism 76. Accordingly, formation of the second web W2 on the mesh belt 72 is promoted, and the speed of discharge from the accumulating unit 60 can be increased. Furthermore, by the suction mechanism 76, a downflow can be formed in the falling path of the mixture, and tangling of the defibrated matter or the additive during falling can be prevented.

The suction blower 77 (accumulation drawing unit) may discharge air drawn from the suction mechanism 76 outside the sheet manufacturing apparatus 100 through a capturing filter not illustrated. Alternatively, the air drawn by the suction blower 77 may be sent into the dust collecting unit 27, and the removed matter included in the air drawn by the suction mechanism 76 may be captured.

Humidified air is supplied to a space including the drum unit 61 by the humidifying unit 208. The humidified air can humidify the inside of the accumulating unit 60, thereby inhibiting attachment of the fibers or particles to the housing unit 63 by static electricity and causing the fibers or particles to quickly fall onto the mesh belt 72. The second web W2 of a preferable shape can be formed.

In such a manner, the second web W2 in a soft and swollen state including a large amount of air is formed through the accumulating unit 60 and the second web forming unit 70. The second web W2 accumulated on the mesh belt 72 is transported to the sheet forming unit 80 (roll unit).

In the transport path of the mesh belt 72, air including mist is supplied on the downstream side of the accumulating unit 60 by the humidifying unit 212. Accordingly, mist generated by the humidifying unit 212 is supplied to the second web W2, and the amount of moisture included in the second web W2 is adjusted. Accordingly, attachment or the like of the fibers to the mesh belt 72 by static electricity can be inhibited.

In the sheet manufacturing apparatus 100, the transport unit 79 that transports the second web W2 on the mesh belt 72 to the sheet forming unit 80 is disposed. The transport unit 79 includes, for example, a mesh belt 79*a*, a stretching roller 79*b*, and a suction mechanism 79*c*.

The suction mechanism 79*c* includes an intermediate blower 79*d* (FIG. 2) and generates an airflow upward of the mesh belt 79*a* by the drawing force of the intermediate blower 79*d*. This airflow draws the second web W2, and the second web W2 is separated from the mesh belt 72 and is adsorbed onto the mesh belt 79*a*. The mesh belt 79*a* moves by rotation of the stretching roller 79*b* and transports the second web W2 to the sheet forming unit 80. For example, the movement speed of the mesh belt 72 is the same as the movement speed of the mesh belt 79*a*.

In such a manner, the transport unit 79 peels and transports the second web W2 formed on the mesh belt 72 from the mesh belt 72.

The sheet forming unit 80 molds the sheet S by pressing and heating the second web W2 accumulated on the mesh belt 72. In the sheet forming unit 80, a plurality of fibers in the mixture are bound to each other through the additive by heating the fibers of the defibrated matter and the additive included in the second web W2.

The sheet forming unit 80 includes a pressing unit 82 that presses the second web W2, and a heating unit 84 that heats the second web W2 pressed by the pressing unit 82.

Figure 2:
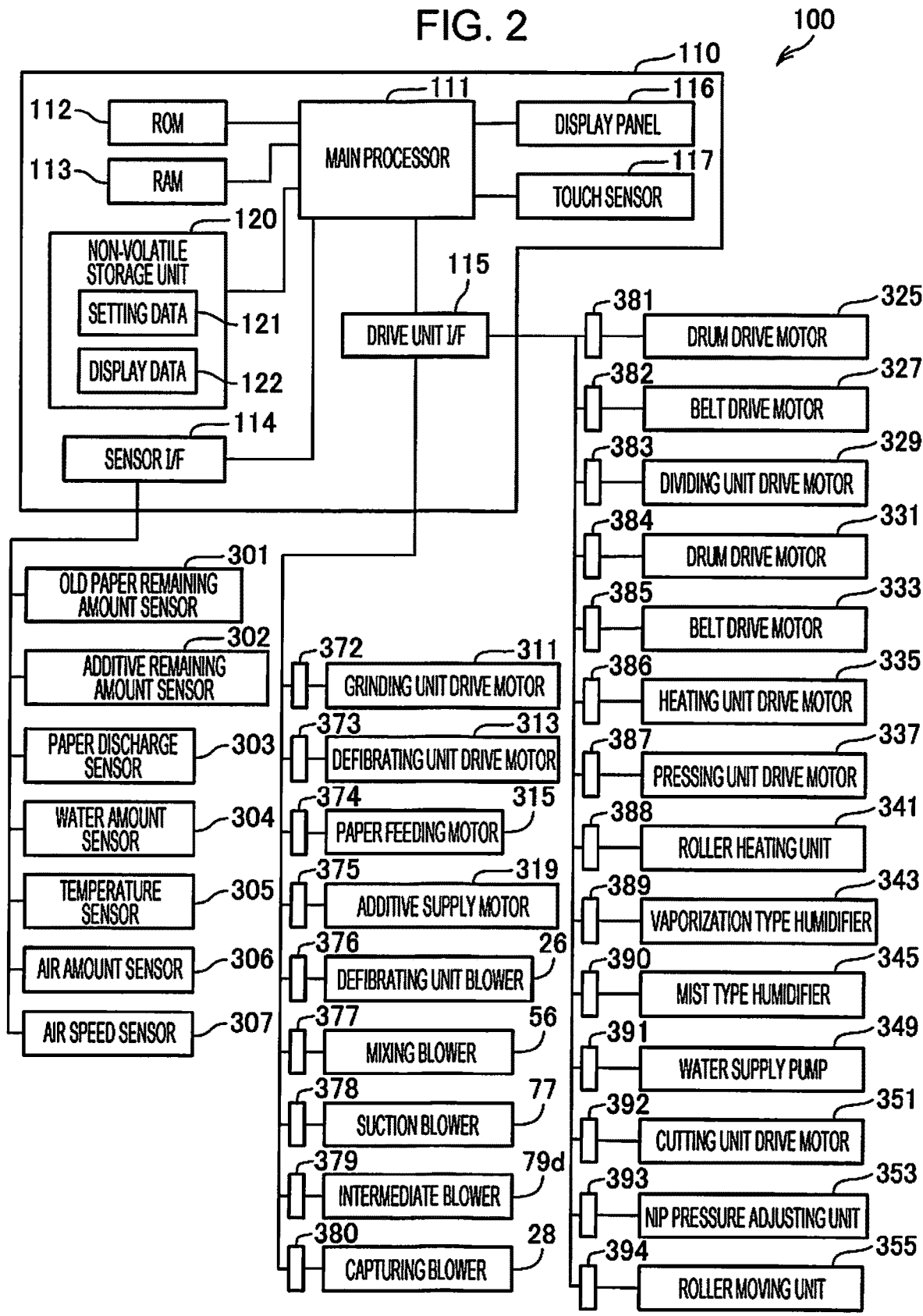
FIG. 2 is a block diagram illustrating a configuration of a control system of the sheet manufacturing apparatus.

The pressing unit 82 is configured with a pair of calender rollers 85 and presses the second web W2 by pinching at a set nip pressure. By pressing, the thickness of the second web W2 is decreased, and the density of the second web W2 is increased. The pressing unit 82 includes a pressing unit drive motor 337 (FIG. 2). One of the pair of calender rollers 85 is a drive roller that is driven by the pressing unit drive motor 337, and the other is a driven roller. The calender rollers 85 rotate by the drive force of the pressing unit drive motor 337 and transport the second web W2 having high density after pressing toward the heating unit 84.

The heating unit 84 (heating roller) can be configured using, for example, a heating roller (heater roller), a heat press molding machine, a hotplate, a warm air blower, an infrared heater, or a flash fixer. In the present embodiment, the heating unit 84 includes a pair of heating rollers 84a and 84b (rollers). The heating rollers 84a and 84b are heated to a preset temperature by a heater that is installed inside or outside the heating rollers 84a and 84b. In the present embodiment, the heating roller 84a includes an elastic material on its surface, that is, its circumferential surface that comes into contact with the second web W2. The heating roller 84b is a hard roller. The heating roller 84a is heated by coming into contact with a heater roller (not illustrated) outside the heating roller 84a. Meanwhile, the heating roller 84b incorporates a heater (not illustrated). The heating rollers 84a and 84b pinch and heat the second web W2 pressed by the calender rollers 85. The heating dissolves the additive and binds the fibers in the second web W2. Thus, the second web W2 heated by the heating rollers 84a and 84b forms the sheet S. Of the heating rollers 84a and 84b, the heating roller 84b is driven by a heating unit drive motor 335 (FIG. 2), and the heating roller 84a is driven by the motion of the heating roller 84b. The heating rollers 84a and 84b rotate by the drive force of the heating unit drive motor 335 and transport the sheet S after heating toward the cutting unit 90.

The number of calender rollers 85 included in the pressing unit 82 is not limited. A plurality of pairs of calender rollers 85 may be included. The same applies to the heating unit 84. A plurality of pairs of heating rollers 84a and 84b may be included.

A tension roller 88 is arranged between the pressing unit 82 and the heating unit 84. The tension roller 88 is a roller that presses the second web W2 and exerts a tensile force on the second web W2 between a nip unit of the calender rollers 85 and a nip unit of the heating rollers 84a and 84b. The tension roller 88 is supported by a roller holder 89 that presses the tension roller 88 toward the second web W2. The roller holder 89 biases the tension roller 88 toward the second web W2. By the biasing force of the roller holder 89, the tension roller 88 removes looseness of the second web W2. In addition, the roller holder 89 incorporates a roller moving unit 355 (FIG. 2). The roller moving unit 355 operates the tension roller 88 in a direction in which the tension roller 88 is moved. Thus, by the drive force of the roller moving unit 355, the tension roller 88 can move in a direction away from the second web W2. In a state where the drive force of the roller moving unit 355 is released, the tension roller 88 is biased toward the second web W2 by biasing means such as a spring that is incorporated in the tension roller 88.

The sheet manufacturing apparatus 100 includes a nip pressure adjusting unit 353 (FIG. 2) that adjusts the nip pressure of at least the heating rollers 84a and 84b. The nip pressure adjusting unit 353 is a drive unit that adjusts the nip pressure of a pair of rollers corresponding to the rollers of the present invention. In the present embodiment, the nip pressure adjusting unit 353 adjusts the nip pressure of the heating rollers 84a and 84b. In a case where the function of the rollers of the present invention is applied to the pair of calender rollers 85, the nip pressure adjusting unit 353 has a function of adjusting the nip pressure of the pair of calender rollers 85.

Figure 3:
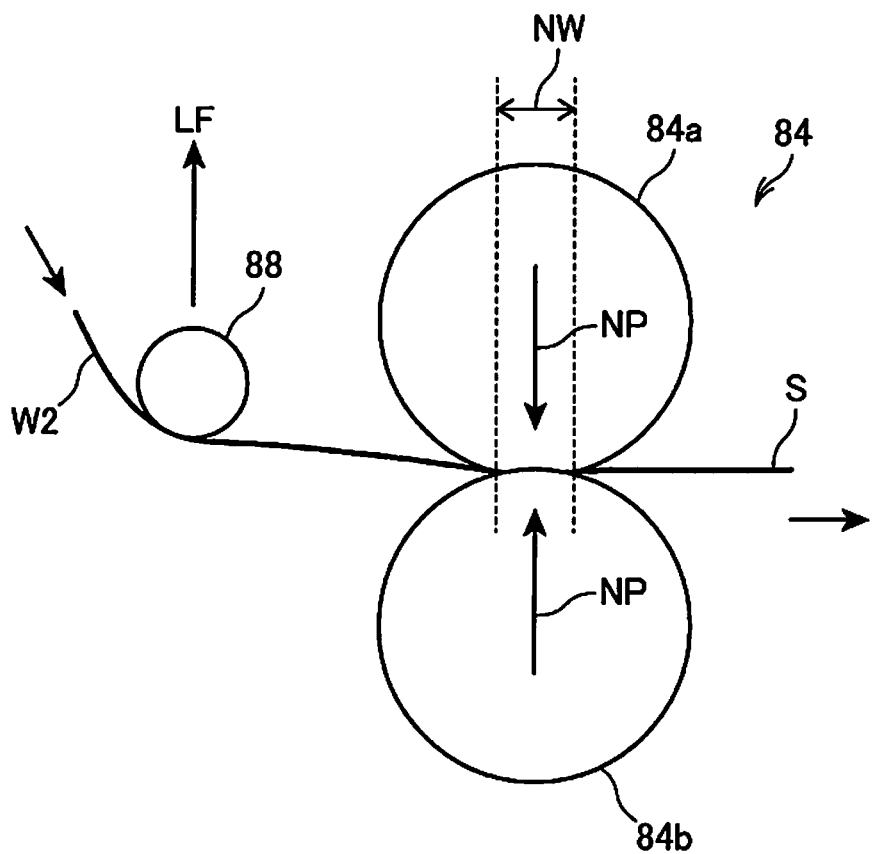
FIG. 3 is a schematic diagram illustrating a configuration of a main part of the sheet manufacturing apparatus.

FIG. 3 is a schematic diagram illustrating a configuration of a main part of the sheet manufacturing apparatus 100.

FIG. 3 illustrates configurations of the tension roller 88 and the heating unit 84.

The heating rollers 84a and 84b constituting the heating unit 84 press the second web W2 at a nip pressure denoted by a reference sign NP in the drawing. The nip pressure NP can be adjusted by the nip pressure adjusting unit 353. The nip pressure adjusting unit 353 can set the nip pressure NP to a normal operation pressure that is set in correspondence with the second web W2, and to a pressure that is lower than the normal operation pressure. The nip pressure adjusting unit 353 can switch at least the nip pressure NP between the two stages and may be configured to more specifically adjust the nip pressure.

The heating roller 84a has elasticity. A nip width NW of the heating rollers 84a and 84b is configured to change depending on the nip pressure NP. In the present embodiment, the surface of the heating roller 84a that comes into contact with the second web W2 is covered with an elastic material such as silicone, polyurethane, or rubber and is elastically deformed by being pressed by the heating roller 84b at the nip pressure NP. Thus, the nip width NW of the heating roller 84a and the heating roller 84b changes depending on the magnitude (strength) of the nip pressure NP. Such a configuration can increase the area of contact of the heating rollers 84a and 84b with the second web W2 during the normal operation. Thus, by securely heating the second web W2 by the heating unit 84 and sufficiently melting the resin of the additive included in the second web W2, an advantage such that the sheet S of high quality can be manufactured is achieved. The heating roller 84b may have elasticity, and the heating roller 84a may be a hard roller.

In addition, the nip width NW changes depending on the nip pressure NP. Thus, by adjusting the nip pressure NP by the nip pressure adjusting unit 353 (FIG. 2), the size of the nip width NW can be adjusted.

In a leading edge paper passing control described below, the sheet manufacturing apparatus 100 decreases the nip pressure NP in a case where the leading edge of the second web W2 passes through the nip unit of the heating rollers 84a and 84b. In this case, the nip pressure NP may be any pressure lower than the pressure during the normal operation and may be almost equal to zero. In a case where the nip pressure NP is decreased, the nip width NW is decreased. Thus, a phenomenon in which the second web W2 is wound onto the heating roller 84a or the heating roller 84b can be inhibited. In addition, since the amount of time in which the leading edge of the second web W2 is heated by the heating rollers 84a and 84b is decreased, wrinkles or distortions are not easily generated on the leading edge of the second web W2. Thus, it can be expected that decreasing the nip pressure NP in a case where the leading edge of the second web W2 passes through the nip unit achieves the effect of inhibiting a jam.

In addition, unlike the time when the leading edge passes, in a case where the nip width NW is large during the normal operation of manufacturing the sheet S, the resin can be melted by sufficiently heating the second web W2, and the quality of the sheet S can be stabilized. Thus, it is preferable that the nip pressure NP be set to the set pressure.

In addition, as illustrated in FIG. 3, the tension roller 88 comes into contact with the second web W2 and performs pressing to remove looseness of the second web W2. The tension roller 88 can be moved in a direction illustrated by an arrow LF in the drawing by the drive force of the roller moving unit 355. In a case where the tension roller 88 moves in the LF direction, a state where the tension roller 88 does not press the second web W2 is set. Preferably, a state where the tension roller 88 does not come into contact with the second web W2 is set.

The thickness of the second web W2 is decreased by pressing the second web W2 by the calender rollers 85. Thus, the second web W2 that has passed through the calender rollers 85 looks as if a web shape having a predetermined thickness is processed into a thinner sheet shape. In the description of the present embodiment, the second web W2 after passing through the calender rollers 85 is also referred to as the second web W2. The second web W2 after pressing and heating by the heating rollers 84a and 84b is referred to as the sheet S.

The cutting unit 90 cuts the sheet S formed by the sheet forming unit 80. In the present embodiment, the cutting unit 90 includes a first cutting unit 92 that cuts the sheet S in a direction intersecting with the transport direction of the sheet S, and a second cutting unit 94 that cuts the sheet S in a direction parallel to the transport direction. For example, the second cutting unit 94 cuts the sheet S that has passed through the first cutting unit 92.

In such a manner, a single cut sheet S of a predetermined size is molded. The single cut sheet S that is cut is discharged to a discharge unit 96. The discharge unit 96 includes a tray or a stacker on which the sheet S of a predetermined size is placed.

In the above configuration, the humidifying units 202, 204, 206, and 208 may be configured with one vaporization type humidifier. In this case, a configuration in which humidified air generated by one humidifier is separately supplied to the grinding unit 12, the housing unit 43, the pipe 7, and the housing unit 63 may be used. This configuration can be easily implemented by separately installing ducts (not illustrated) for supplying the humidified air. In addition, the humidifying units 202, 204, 206, and 208 can also be configured with two or three vaporization type humidifiers. In the present embodiment, humidified air is supplied to the humidifying units 202, 204, 206, and 208 from a vaporization type humidifier 343 (FIG. 2) as will be described below.

In addition, in the above configuration, the humidifying units 210 and 212 may be configured with one ultrasonic type humidifier or may be configured with two ultrasonic type humidifiers. For example, a configuration in which air that includes mist generated by one humidifier is separately supplied to the humidifying unit 210 and the humidifying unit 212 can be used. In the present embodiment, air including mist is supplied to the humidifying units 210 and 212 by a mist type humidifier 345 (FIG. 2) described below.

In addition, blowers included in the sheet manufacturing apparatus 100 are not limited to the defibrating unit blower 26, the capturing blower 28, the mixing blower 56, the suction blower 77, and the intermediate blower 79d. For example, a fan that assists each blower can also be disposed in a duct.

In addition, while the grinding unit 12 initially grinds the raw material, and the sheet S is manufactured from the ground raw material in the above configuration, a configuration, for example, in which the sheet S is manufactured using fibers as the raw material can be used.

For example, a configuration in which fibers equivalent to the defibrated matter subjected to the defibration process by the defibrating unit 20 can be put into the drum unit 41 as the raw material may be used. In addition, a configuration in which fibers equivalent to the first selected matter separated from the defibrated matter can be put into the pipe 54 as the raw material may be used. In this case, the sheet S can be manufactured by supplying fibers processed from old paper, pulp, and the like to the sheet manufacturing apparatus 100.

FIG. 2 is a block diagram illustrating a configuration of a control system of the sheet manufacturing apparatus 100.

The sheet manufacturing apparatus 100 includes a control device 110 that includes a main processor 111 controlling each unit of the sheet manufacturing apparatus 100.

The control device 110 includes the main processor 111, a read only memory (ROM) 112, and a random access memory (RAM) 113. The main processor 111 is an operation processing device such as a central processing unit (CPU) and controls each unit of the sheet manufacturing apparatus 100 by executing a basic control program stored in the ROM 112. The main processor 111 may be configured as a system chip that includes peripheral circuits such as the ROM 112 and the RAM 113 and other IP cores.

The ROM 112 stores the program executed by the main processor 111 in a non-volatile manner. The RAM 113 forms a work area used by the main processor 111 and temporarily stores the program executed by the main processor 111 and process target data.

A non-volatile storage unit 120 stores the program executed by the main processor 111 and data processed by the main processor 111. For example, the non-volatile storage unit 120 stores setting data 121 and display data 122. The setting data 121 includes data for setting the operation of the sheet manufacturing apparatus 100. For example, the setting data 121 includes data such as the characteristics of various sensors included in the sheet manufacturing apparatus 100 and a threshold used in a process in which the main processor 111 detects a malfunction based on the output values of various sensors. The display data 122 is screen data displayed on a display panel 116 by the main processor 111. The display data 122 may be static image data or may be data for setting a screen display that displays data generated or acquired by the main processor 111.

The display panel 116 is a display panel such as a liquid crystal display and, for example, is installed on the front surface of the sheet manufacturing apparatus 100. The display panel 116 displays the operating state, various setting values, an alert display, and the like of the sheet manufacturing apparatus 100 in accordance with control of the main processor 111.

A touch sensor 117 detects a touch (contact) operation or a press operation. For example, the touch sensor 117 is configured with a pressure sensitive type or an electrostatic capacitive type sensor including a transparent electrode and is arranged in an overlaid manner on the display surface of the display panel 116. In a case where the touch sensor 117 detects the operation, the touch sensor 117 outputs operation data including an operation position and the number of operation positions to the main processor 111. The main processor 111 detects the operation performed on the display panel 116 and acquires the operation position by the output of the touch sensor 117. The main processor 111 implements a graphical user interface (GUI) operation based on the operation position detected by the touch sensor 117 and the display data 122 being displayed on the display panel 116.

The control device 110 is connected through a sensor interface (I/F) 114 to a sensor that is installed in each unit of the sheet manufacturing apparatus 100. The sensor I/F 114 is an interface that acquires a detection value output by the sensor and inputs the detection value into the main processor 111. The sensor I/F 114 may include an analogue/digital (A/D) converter that converts an analog signal output by the sensor into digital data. In addition, the sensor I/F 114 may supply a drive current to each sensor. In addition, the sensor I/F 114 may include a circuit that acquires the output value of each sensor in accordance with a sampling frequency specified by the main processor 111 and outputs the output value to the main processor 111.

An old paper remaining amount sensor 301, an additive remaining amount sensor 302, a paper discharge sensor 303, a water amount sensor 304, a temperature sensor 305, an air amount sensor 306, and an air speed sensor 307 are connected to the sensor I/F 114.

The control device 110 is connected to each drive unit included in the sheet manufacturing apparatus 100 through a drive unit interface (I/F) 115. The drive units included in the sheet manufacturing apparatus 100 are a motor, a pump, a heater, and the like. As illustrated in FIG. 2, the drive unit I/F 115 is connected to each drive unit through drive integrated circuits (IC) 372 to 394. The drive ICs 372 to 394 are circuits that supply a drive current to the drive units in accordance with control of the main processor 111 and are configured with electric power semiconductor elements or the like. For example, the drive ICs 372 to 394 are drive circuits that drive inverter circuits or stepping motors. A specific configuration and specifications of each of the drive ICs 372 to 394 are appropriately selected depending on the connected drive unit.

Figure 4:
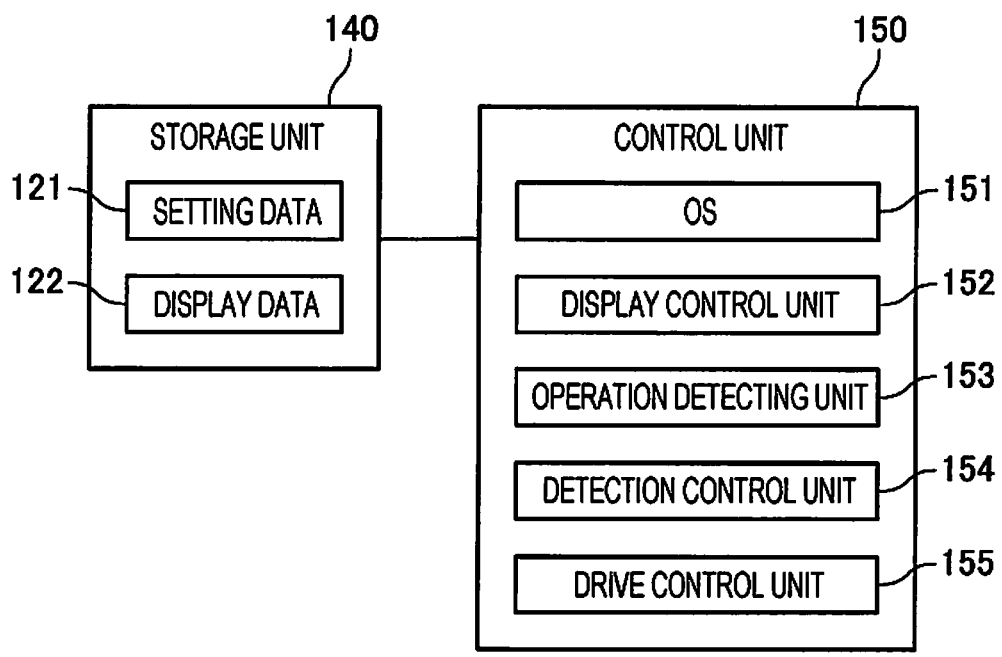
FIG. 4 is a function block diagram of a control device.

FIG. 4 is a function block diagram of the sheet manufacturing apparatus 100 and illustrates a functional configuration of a storage unit 140 and the control unit 150. The storage unit 140 is a logical storage unit configured with the non-volatile storage unit 120 (FIG. 2) and may include the ROM 112.

The control unit 150 and various functional units included in the control unit 150 are formed in cooperation between software and hardware by causing the main processor 111 to execute the program. The hardware constituting the functional units is exemplified by, for example, the main processor 111, the ROM 112, the RAM 113, and the non-volatile storage unit 120.

The control unit 150 has the functions of an operating system (OS) 151, a display control unit 152, an operation detecting unit 153, a detection control unit 154, and a drive control unit 155.

The function of the operating system 151 is the function of a control program stored in the storage unit 140. Other units of the control unit 150 have the function of an application program that is executed on the operating system 151.

The display control unit 152 displays an image on the display panel 116 based on the display data 122.

The operation detecting unit 153 determines the content of the GUI operation corresponding to the detected operation position in a case where an operation performed on the touch sensor 117 is detected.

The detection control unit 154 acquires the detection values of various sensors connected to the sensor I/F 114. In addition, the detection control unit 154 performs a determination by comparing the output values of the sensors connected to the sensor I/F 114 with a preset threshold (setting value). In a case where the determination result corresponds to a condition for performing notification, the detection control unit 154 causes the display control unit 152 to perform notification based on an image or a text by outputting a notification content to the display control unit 152.

The drive control unit 155 controls the start (booting) and the stoppage of each drive unit connected through the drive unit I/F 115. In addition, the drive control unit 155 may be configured to control the number of rotations for the defibrating unit blower 26, the mixing blower 56, and the like.

Returning to FIG. 2, a grinding unit drive motor 311 is connected to the drive unit I/F 115 through the drive IC 372. The grinding unit drive motor 311 rotates a cutting blade (not illustrated) that cuts old paper which is the raw material.

A defibrating unit drive motor 313 is connected to the drive unit I/F 115 through the drive IC 373. The defibrating unit drive motor 313 rotates the rotor (not illustrated) included in the defibrating unit 20.

The paper feeding motor 315 is connected to the drive unit I/F 115 through the drive IC 374. The paper feeding motor 315 is attached to the supply unit 10 and drives a roller (not illustrated) that transports old paper. In a case where a drive current is supplied to the paper feeding motor 315 from the drive IC 374 by control of the control unit 150, and the paper feeding motor 315 operates, old paper that is the raw material accumulated by the supply unit 10 is sent to the grinding unit 12.

An additive supply motor 319 is connected to the drive unit I/F 115 through the drive IC 375. The additive supply motor 319 drives a screw feeder that sends the additive in the discharge unit 52a. In addition, the additive supply motor 319 is connected to the discharge unit 52a and opens and closes the discharge unit 52a.

In addition, the defibrating unit blower 26 is connected to the drive unit I/F 115 through the drive IC 376. Similarly, the mixing blower 56 is connected to the drive unit I/F 115 through the drive IC 377. In addition, the suction blower 77 is connected to the drive unit I/F 115 through the drive IC 378, and the intermediate blower 79d is connected to the drive unit I/F 115 through the drive IC 379. In addition, the capturing blower 28 is connected to the drive unit I/F 115 through the drive IC 380. Such a configuration enables the control device 110 to control the start and the stoppage of the defibrating unit blower 26, the mixing blower 56, the suction blower 77, the intermediate blower 79d, and the capturing blower 28. In addition, the control device 110 may be configured to be able to control the number of rotations of those blowers. In this case, for example, inverters may be used as the drive ICs 376 to 380.

A drum drive motor 325 is a motor that rotates the drum unit 41, and is connected to the drive unit I/F 115 through the drive IC 381.

A belt drive motor 327 is a motor that drives the mesh belt 46, and is connected to the drive unit I/F 115 through the drive IC 382.

A dividing unit drive motor 329 is a motor that rotates the rotating body 49, and is connected to the drive unit I/F 115 through the drive IC 383.

A drum drive motor 331 is a motor that rotates the drum unit 61, and is connected to the drive unit I/F 115 through the drive IC 384.

A belt drive motor 333 is a motor that drives the mesh belt 72, and is connected to the drive unit I/F 115 through the drive IC 385.

The heating unit drive motor 335 is a motor that drives the heating rollers 84a and 84b of the heating unit 84, and is connected to the drive unit I/F 115 through the drive IC 386.

The pressing unit drive motor 337 is a motor that drives the calender rollers 85 of the pressing unit 82, and is connected to the drive unit I/F 115 through the drive IC 387.

A roller heating unit 341 is a heater that heats the heating rollers 84a and 84b. The roller heating unit 341 of the present embodiment includes a heat generating body of the heater roller (not illustrated) that heats the circumferential surface of the heating roller 84a, and a heat generating body incorporated in the heating roller 84b. The roller heating unit 341 is connected to the drive unit I/F 115 through the drive IC 388.

The vaporization type humidifier 343 is a device that includes a tank (not illustrated) retaining water and a filter (not illustrated) through which the water in the tank permeates, and performs humidification by sending air to the filter. The vaporization type humidifier 343 is connected to the drive unit I/F 115 through the drive IC 389 and switches sending of air to the filter ON/OFF in accordance with control of the control unit 150. In the present embodiment, humidified air is supplied to the humidifying units 202, 204, 206, and 208 from the vaporization type humidifier 343. Accordingly, the humidifying units 202, 204, 206, and 208 supply the humidified air supplied by the vaporization type humidifier 343 to the grinding unit 12, the selecting unit 40, the pipe 54, and the accumulating unit 60. The vaporization type humidifier 343 may be configured with a plurality of vaporization type humidifiers. In this case, a location where each vaporization type humidifier is installed may be any of the grinding unit 12, the selecting unit 40, the pipe 54, or the accumulating unit 60.

The mist type humidifier 345 includes a tank (not illustrated) that retains water, and a vibrating unit that generates atomized water droplets (mist) by exerting vibration to the water in the tank. The mist type humidifier 345 is connected to the drive unit I/F 115 through the drive IC 390 and switches the vibrating unit ON/OFF in accordance with control of the control unit 150. In the present embodiment, air including mist is supplied to the humidifying units 210 and 212 from the mist type humidifier 345. Accordingly, the humidifying units 210 and 212 supply air including mist supplied by the mist type humidifier 345 to each of the first web W1 and the second web. W2.

A water supply pump 349 is a pump that draws water from the outside of the sheet manufacturing apparatus 100 and fills a tank (not illustrated) included inside the sheet manufacturing apparatus 100 with water. For example, in a case where the sheet manufacturing apparatus 100 is started, an operator who operates the sheet manufacturing apparatus 100 performs setting by pouring water into a water supply tank. The sheet manufacturing apparatus 100 operates the water supply pump 349 and fills the tank inside the sheet manufacturing apparatus 100 with water from the water supply tank. In addition, the water supply pump 349 may supply water to the vaporization type humidifier 343 and the mist type humidifier 345 from the tank of the sheet manufacturing apparatus 100.

A cutting unit drive motor 351 is a motor that drives the first cutting unit 92 and the second cutting unit 94 of the cutting unit 90. The cutting unit drive motor 351 is connected to the drive unit I/F 115 through the drive IC 392.

The nip pressure adjusting unit 353 adjusts the nip pressure NP (FIG. 3) of the heating rollers 84a and 84b. For example, the nip pressure adjusting unit 353 is a pressing mechanism that exerts the nip pressure NP by pressing the heating rollers 84a and 84b, and changes the nip pressure NP in accordance with control of the control unit 150. The nip pressure adjusting unit 353 is connected to the drive unit I/F 115 through the drive IC 393.

The roller moving unit 355 is connected to the drive unit I/F 115 through the drive IC 394. The roller moving unit 355 is installed in the roller holder 89 and moves the tension roller 88 in a direction away from the second web W2 in accordance with control of the control unit 150.

The old paper remaining amount sensor 301 is a sensor that detects the remaining amount of old paper which is the raw material supplied to the grinding unit 12. The old paper remaining amount sensor 301 detects the remaining amount of old paper contained in the supply unit 10 (FIG. 1). For example, the control unit 150 performs notification of insufficient old paper in a case where the remaining amount of old paper detected by the old paper remaining amount sensor 301 becomes below a setting value.

The additive remaining amount sensor 302 is a sensor that detects the remaining amount of the additive suppliable from the additive supply unit 52. The additive remaining amount sensor 302 detects the remaining amount of the additive in the additive cartridge connected to the additive supply unit 52. For example, the control unit 150 performs notification in a case where the remaining amount of the additive detected by the additive remaining amount sensor 302 becomes below a setting value.

The paper discharge sensor 303 detects the amount of the sheet S accumulated in the tray or the stacker included in the discharge unit 96. The control unit 150 performs notification in a case where the amount of the sheet S detected by the paper discharge sensor 303 becomes greater than or equal to a setting value.

The water amount sensor 304 is a sensor that detects the amount of water in the tank (not illustrated) incorporated in the sheet manufacturing apparatus 100. The control unit 150 performs notification in a case where the amount of water detected by the water amount sensor 304 becomes below a setting value. In addition, the water amount sensor 304 may also be configured to be able to detect the remaining capacity of the tank of the vaporization type humidifier 343 and/or the mist type humidifier 345.

The temperature sensor 305 detects the temperature of air flowing inside the sheet manufacturing apparatus 100. In addition, the air amount sensor 306 detects the air amount of air flowing inside the sheet manufacturing apparatus 100. In addition, the air speed sensor 307 detects the air speed of air flowing inside the sheet manufacturing apparatus 100. For example, the temperature sensor 305, the air amount sensor 306, and the air speed sensor 307 are installed in the pipe 29 through which air discharged by the capturing blower 28 flows, and detect the temperature, the air amount, and the air speed. The control unit 150 determines the state of the airflow inside the sheet manufacturing apparatus 100 based on the detection values of the temperature sensor 305, the air amount sensor 306, and the air speed sensor 307. The control unit 150 appropriately maintains the state of the airflow inside the sheet manufacturing apparatus 100 by controlling the number of rotations of the defibrating unit blower 26, the mixing blower 56, and the like based on the determination result.

Next, the operation of the sheet manufacturing apparatus 100 will be described.

Figure 5:
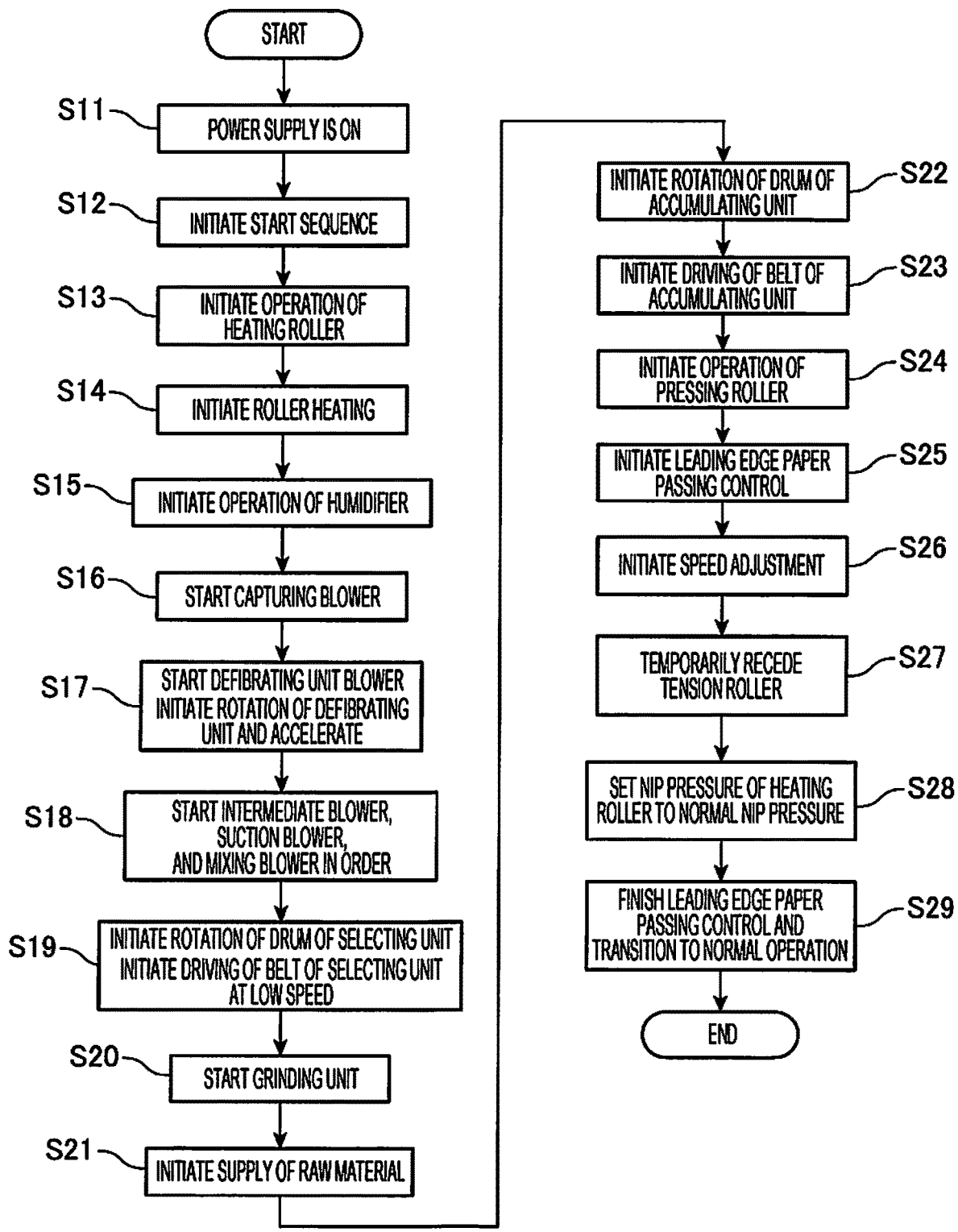
FIG. 5 is a flowchart illustrating an operation of the sheet manufacturing apparatus.

FIG. 5 is a flowchart illustrating the operation of the sheet manufacturing apparatus 100 and particularly, illustrates an operation of starting the sheet manufacturing apparatus 100 by control of the control unit 150. In addition, FIG. 6 and FIG. 7 are timing charts illustrating the operation of the sheet manufacturing apparatus 100 and illustrate a change in the operating state of each drive unit in a case where the sheet manufacturing apparatus 100 is started.

Figure 6:
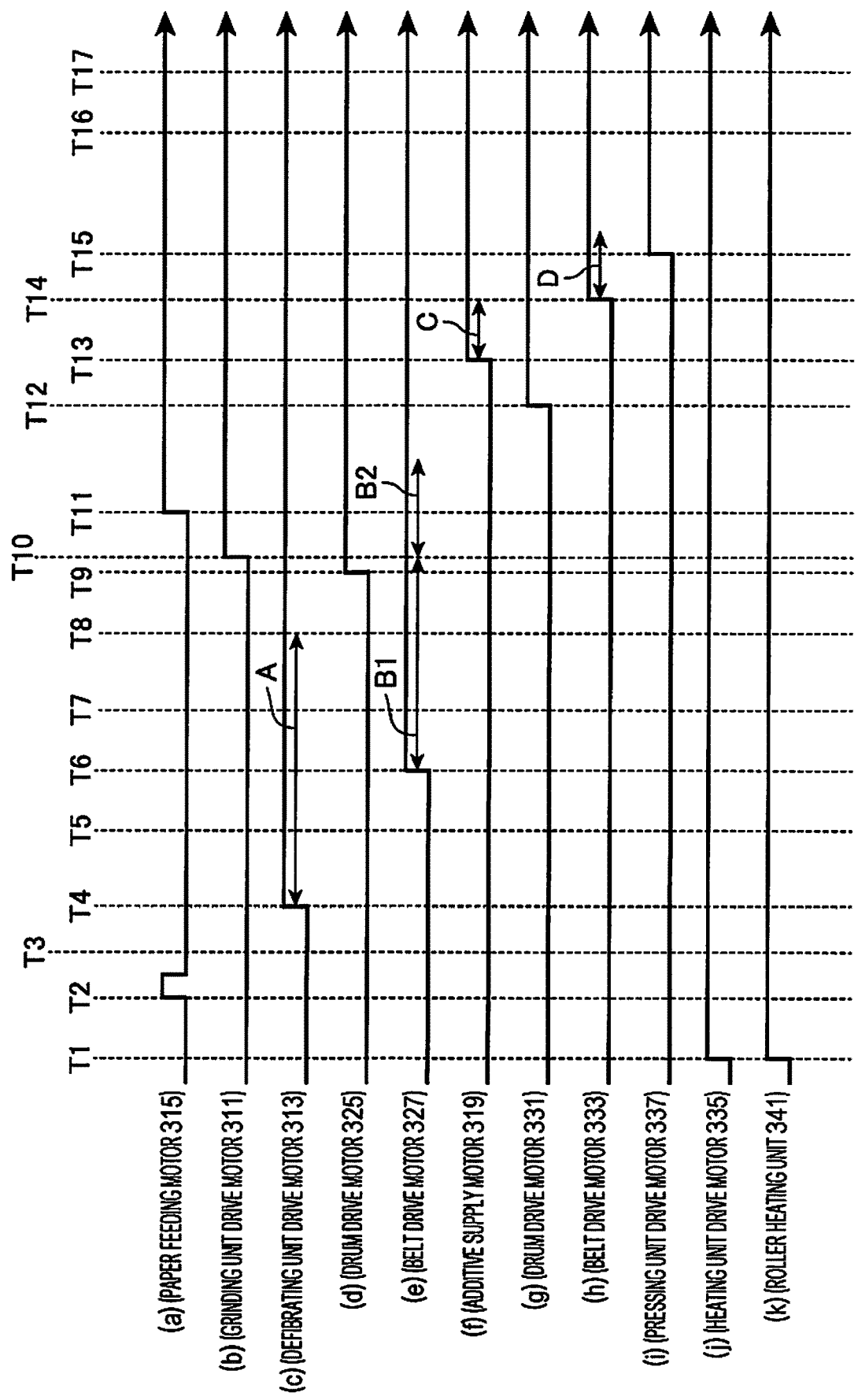
FIG. 6 is a timing chart illustrating the operation of the sheet manufacturing apparatus.
Figure 7:
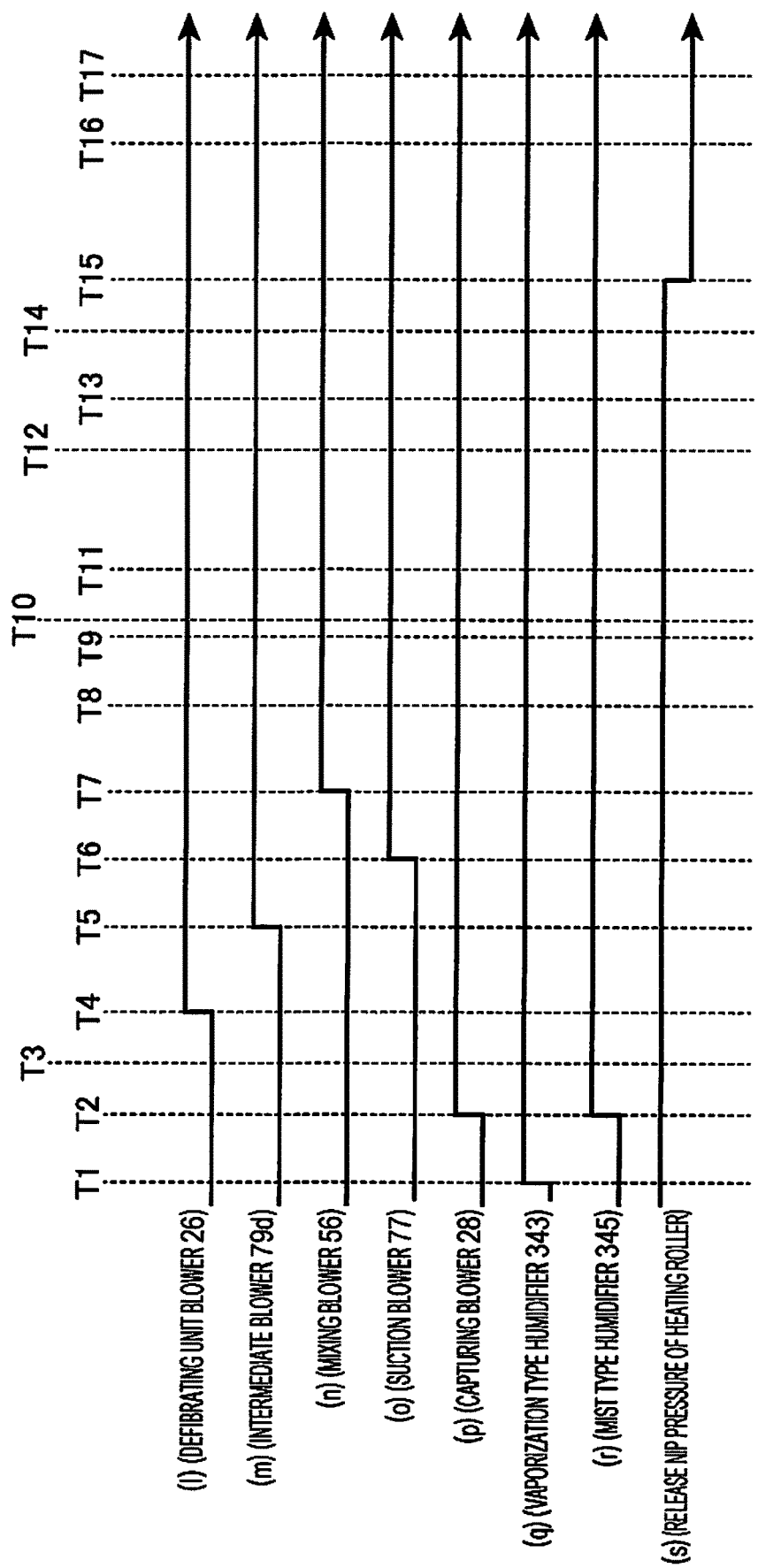
FIG. 7 is a timing chart illustrating the operation of the sheet manufacturing apparatus.

The operation illustrated in FIG. 5 to FIG. 7 shows an operation in a case where the sheet manufacturing apparatus 100 is started in a state where a material is not present inside the sheet manufacturing apparatus 100. The state where a material is not present inside the sheet manufacturing apparatus 100 refers to a state where the second web W2 is not present in at least the nip unit of the heating rollers 84a and 84b. This state may be a state where the second web W2 and the sheet S are not present among the nip unit of the calender rollers 85, the heating unit 84, and the cutting unit 90. Furthermore, the state may be a state where the second web W2 is not present in the second web forming unit 70 and the transport unit 79, or may be a state where the mixture is not present in the accumulating unit 60. In addition, the state may be a state where the mixture or the subdivided body P is not present in the pipe 54 and the mixing unit 50.

In the following description, a state where the raw material and various materials or processed matter derived from the raw material are removed from the inside of the sheet manufacturing apparatus 100 for a reason such as maintenance of the sheet manufacturing apparatus 100, and a state before the sheet manufacturing apparatus 100 is operated for the first time will be described as the most typical example.

In this state, the mixture is not present in the mixing unit 50, the pipe 54, and the accumulating unit 60. The second web W2 is not present in the second web forming unit 70 and the transport unit 79. The second web W2 and the sheet S are not present in the sheet forming unit 80 and the cutting unit 90. In addition, the state may be a state where old paper as the raw material and the ground matter are not present in the grinding unit 12, the ground matter and the defibrated matter are not present inside the defibrating unit 20, and any of the defibrated matter, the first selected matter, or the second selected matter is not present in the selecting unit 40 and the first web forming unit 45.

In such a state, the leading edge of the second web W2 formed by the second web forming unit 70 enters and passes through the nip unit of the calender rollers 85 and the nip unit of the heating rollers 84a and 84b through the transport unit 79. In this stage, a jam occurs easily. Thus, in a case where the leading edge of the second web W2 passes through the sheet forming unit 80, the sheet manufacturing apparatus 100 executes the leading edge paper passing control and inhibits the occurrence of a jam.

In FIG. 6, the operation of the paper feeding motor 315 is illustrated in (a). The operation of the grinding unit drive motor 311 is illustrated in (b). The operation of the defibrating unit drive motor 313 is illustrated in (c). The operation of the drum drive motor 325 is illustrated in (d). The operation of the belt drive motor 327 is illustrated in (e). The operation of the additive supply motor 319 is illustrated in (f). The operation of the drum drive motor 331 is illustrated in (g). The operation of the belt drive motor 333 is illustrated in (h). The operation of the pressing unit drive motor 337 is illustrated in (i). The operation of the heating unit drive motor 335 is illustrated in (j). The operation of the roller heating unit 341 is illustrated in (k).

In FIG. 7, the operation of the defibrating unit blower 26 is illustrated in (l). The operation of the intermediate blower 79d is illustrated in (m). The operation of the mixing blower 56 is illustrated in (n). The operation of the suction blower 77 is illustrated in (o). The operation of the capturing blower 28 is illustrated in (p). The operation of the vaporization type humidifier 343 is illustrated in (q). The operation of the mist type humidifier 345 is illustrated in (r). An operation of releasing the nip pressure of the heating rollers 84a and 84b by the nip pressure adjusting unit 353 is illustrated in (s).

In the control unit 150, in a case where a power supply ON instruction is provided to the sheet manufacturing apparatus 100 by an operation or the like performed on a power supply ON switch not illustrated (step S11), the control unit 150 supplies water by operating the water supply pump 349 in accordance with an operation or the like of the operator. Then, the control unit 150 initiates a start sequence (start control) (step S12).

The control unit 150 initiates rotation of the heating rollers 84a and 84b by starting the heating unit drive motor 335 (step S13) and initiates heating by the roller heating unit 341 (step S14). In addition, the control unit 150 initiates humidification (step S15).

In the timing charts in FIG. 6 and FIG. 7, the start sequence is initiated at time T1. As illustrated in (j) and (k) in FIG. 6, the heating unit drive motor 335 and the roller heating unit 341 are switched ON at time T1. As described above, the heating roller 84a of the present embodiment is heated by the heater (not illustrated) outside the heating roller 84a. Thus, it is desirable to rotate the heating roller 84a during heating by the roller heating unit 341.

In addition, as illustrated in (q) in FIG. 7, the operation of the vaporization type humidifier 343 is initiated at time T1. As illustrated in (r) in FIG. 7, the operation of the mist type humidifier 345 is initiated at time T2, and humidification of the sheet manufacturing apparatus 100 is initiated. Accordingly, a space in which a material moves inside the sheet manufacturing apparatus 100 can be humidified before a motor and the like are started. The operation of the vaporization type humidifier 343 and the mist type humidifier 345 may be initiated at the same time, or the operation of the vaporization type humidifier 343 may be initiated first, considering a relatively large amount of time for the effect of humidification by the vaporization type humidifier 343. The operation of the mist type humidifier 345 may be initiated at the same time as driving of the belt drive motor 327.

In addition, at time T2, the supply unit 10 may be initialized in order to confirm that the raw material can be supplied from the supply unit 10.

The control unit 150 operates the capturing blower 28 to set a state where the removed matter can be captured (step S16). Next, the control unit 150 initiates rotation of the defibrating unit drive motor 313 by starting the defibrating unit blower 26 (step S17). As described above, since the defibrating unit 20 rotates at a high speed, the defibrating unit drive motor 313 initiates acceleration immediately after its start.

As illustrated in (p) in FIG. 7, the capturing blower 28 is started at an earlier timing (time T2) than other blowers in order to prevent scattering of the removed matter inside the sheet manufacturing apparatus 100. As illustrated in (l) in FIG. 7, the defibrating unit blower 26 is started at time T4. As illustrated in (c) in FIG. 6, the defibrating unit drive motor 313 is switched ON at time T4. The defibrating unit drive motor 313 is accelerated to the speed of the normal operation during a period A to time T8.

Furthermore, the control unit 150 starts the intermediate blower 79d, the suction blower 77, and the mixing blower 56 in order (step S18).

Specifically, as illustrated in (m) in FIG. 7, the intermediate blower 79d is started at time T5. As illustrated in (o) in FIG. 7, the suction blower 77 is started at time T6. As illustrated in (n) in FIG. 7, the mixing blower 56 is started at time T7. Since the mixing blower 56 sends air toward the accumulating unit 60, there is a possibility that the material is separated from the mesh belts 72 and 79a by the airflow in a case where the mixing blower 56 is started in a state where the suction blower 77 and the intermediate blower 79d are stopped. Thus, it is preferable that the mixing blower 56 be started after the suction blower 77 and the intermediate blower 79d initiate drawing. The present embodiment describes a case where the sheet manufacturing apparatus 100 is started in a state where the raw material or the material is not present inside the sheet manufacturing apparatus 100. However, even in such a state, the start order of each blower is set to an order that can avoid undesirable scattering and movement of the raw material or the material.

The control unit 150 initiates the operation of the drum unit 41 of the selecting unit 40 and the mesh belt 46 of the first web forming unit 45 (step S19). The operation of the mesh belt 46 immediately after initiation is set to be at a lower speed than a speed V1 of the normal operation.

As illustrated in (d) in FIG. 6, the operation of the drum drive motor 325 is initiated at time T9.

As illustrated in (e) in FIG. 6, the control unit 150 starts the belt drive motor 327 at time T6 at which the suction blower 77 is booted, or at a slightly earlier timing than time T6. The control unit 150 sets the operating speed of the belt drive motor 327 to a low speed during a predetermined period after the start of the belt drive motor 327. In the present embodiment, the speed of the mesh belt 46 is set to a lower speed than the speed V1 of the normal operation, for example, a speed of ⅛ of the speed V1, during a period B1 to time T10. Then, for example, at time T10, the control unit 150 increases the operating speed of the belt drive motor 327. The speed after increase is a lower speed than the speed V1 of the normal operation. In the present embodiment, the speed of the mesh belt 46 is set to approximately ⅓ of the speed V1 of the normal operation from time T10 to a predetermined time between time T11 and time T12, that is, during a period B2 illustrated in (e) in FIG. 6. After the elapse of the period B2, the control unit 150 switches the speed of the belt drive motor 327 to the speed of the normal operation, and the speed of the mesh belt 46 becomes equal to the speed V1 of the normal operation. While the timing at which the speed of the belt drive motor 327 is set to the speed V1 is not limited, it is preferable that the timing be before the operation of the drum drive motor 331 at time T12.

The control unit 150 starts the grinding unit 12 (step S20) and then, initiates supply of the raw material to the grinding unit 12 from the supply unit 10 (step S21).

As illustrated in (b) in FIG. 6, at time T10, the grinding unit drive motor 311 is started, and the operation of the grinding unit 12 is initiated. At time T11, the paper feeding motor 315 is started. While the defibrating unit 20 has already started at time T4, the defibrating unit 20 initiates the defibration process after supply of the raw material to the grinding unit 12 is initiated at time T11, and the defibrated matter is supplied to the drum unit 41.

The control unit 150 initiates rotation of the drum unit 61 of the accumulating unit 60 (step S22) and initiates driving of the mesh belt 72 (step S23). As illustrated in (g) in FIG. 6, the operation of the drum drive motor 331 is initiated at time T12. Then, as illustrated in (h) in FIG. 6, the operation of the belt drive motor 333 is initiated at time T14.

In addition, as illustrated in (f) in FIG. 6, the additive supply motor 319 is started at time T13, and the additive is sent to the pipe 54 from the discharge unit 52a. The additive supply motor 319 rotates at a lower speed than the speed of the normal operation during a set time (for example, a period C) from operation initiation. The length of the period C is preset. Since the number of rotations of the additive supply motor 319 is low, the amount of the additive supplied from the discharge unit 52a during the period C is smaller than that of the normal operation. Thus, the amount of the additive included in the mixture sent to the drum unit 41 by the mixing blower 56 is decreased. The additive discharged during the period C is included in the mixture that is initially sent to the drum unit 41 after the start of the sheet manufacturing apparatus 100, and forms the leading edge of the second web W2 formed on the mesh belt 72. That is, the control unit 150 performs a control for reducing the amount of resin in the mixture that forms the leading edge of the second web W2. More specifically, the content of resin in the leading edge of the second web W2 is smaller than the amount of resin in other parts of the second web W2. The period C corresponds to a period in which the additive used for manufacturing a part within a predetermined distance from the leading edge of the second web W2 is supplied. Accordingly, the part within the predetermined distance from the leading edge of the second web W2 is not easily wound, wrinkled, or distorted when being heated by the heating rollers 84a and 84b. Accordingly, the effect of inhibiting the occurrence of a jam on the leading edge of the second web W2 can be expected.

The reason why the timing of the start of the belt drive motor 333 (T14) is later than the start of the drum drive motor 331 (T12) is that a cut in the second web W2 is avoided by sufficiently securing the thickness of the second web W2 accumulated on the mesh belt 72. Particularly, since the operation in FIG. 5 to FIG. 7 is started from a state where the second web W2 is not present, the leading edge of the second web W2 is formed on the mesh belt 72. Thus, the control unit 150 delays the timing of operation initiation of the mesh belt 72 by controlling the belt drive motor 333 so that a sufficient amount of the mixture is accumulated on the leading edge of the second web W2, and the leading edge of the second web W2 is securely transported. Preferably, the leading edge of the second web W2 is formed to have a greater thickness than the thickness of the second web W2 other than its leading edge.

At the timings (time T12 and T14) at which the belt drive motor 333 and the drum drive motor 331 are started, the paper feeding motor 315, the grinding unit drive motor 311, and the defibrating unit drive motor 313 are already in operation, and the operation of the mixing blower 56 has been initiated. Thus, at the timing at which the drum drive motor 331 is started, or soon after the timing, the sheet manufacturing apparatus 100 is set to be in a state where the mixture is introduced into the selecting unit 40 and falls to the mesh belt 46.

For a preset time (for example, a period D in FIG. 6) from the start of the belt drive motor 333 at time T14, the control unit 150 controls the speed of the belt drive motor 333 to a speed including the speed of the normal operation and a lower speed than the speed of the normal operation.

While a detailed description will be provided below with reference to FIG. 8, the mesh belt 72 is controlled to be at the speed of the normal operation or a lower speed than the speed of the normal operation for a preset time after the start of the belt drive motor 333. For example, by causing the control unit 150 to set the mesh belt 72 to move at a low speed, the leading edge of the second web W2 passes below the accumulating unit 60 and the humidifying unit 212 at a low speed. Humidified air is supplied to the accumulating unit 60 by the humidifying unit 208, and mist is provided to the second web W2 by the humidifying unit 212. Thus, the leading edge of the second web W2 can be sufficiently humidified by causing the control unit 150 to decrease the speed of the mesh belt 72. Accordingly, since static electricity that is charged in the leading edge of the second web W2 can be effectively removed, clinging caused by static electricity can be inhibited. For example, adsorption of the second web W2 to the mesh belt 79a, the calender rollers 85, the tension roller 88, and the like by static electricity can be prevented. In addition, in a case where the leading edge of the second web W2 is moved at a low speed in the accumulating unit 60, a large amount of the mixture is accumulated on the leading edge of the second web W2. Thus, the thickness of the leading edge of the second web W2 can be increased along with setting of the timing of the start of the belt drive motor 333 to be later than the start of the drum drive motor 331.

By increasing the thickness of the leading edge of the second web W2, the leading edge of the second web W2 easily passes through the nip unit of the calender rollers 85 and/or the heating rollers 84a and 84b, and the effect of inhibiting the occurrence of a jam is achieved. In addition, transport of the second web W2 wound onto the calender rollers 85 to the heating unit 84 does not easily occur, and a so-called winding phenomenon can be inhibited by increasing the thickness of the leading edge of the second web W2. Reducing the effect of static electricity by sufficiently humidifying the leading edge of the second web W2 by the accumulating unit 60 and the humidifying unit 212 also contributes to inhibition of winding. Thus, the occurrence of a jam in a case where the leading edge of the second web W2 passes through the sheet forming unit 80 can be more securely prevented.

In addition, while illustration is not provided in the timing charts, the control unit 150 drives the mesh belt 79a at a speed corresponding to the mesh belt 72. Accordingly, a cut in the second web W2 in a case where the second web W2 moves to the mesh belt 79a from the mesh belt 72 can be prevented.

The control unit 150 initiates rotation of the calender rollers 85 (step S24). As illustrated in (i) in FIG. 6, starting the pressing unit drive motor 337 at time T15 causes the calender rollers 85 to start rotating.

The control unit 150 initiates the leading edge paper passing control so that the formed second web W2 easily passes through the calender rollers 85 and the heating unit 84 by the mesh belt 72 (step S25). In the leading edge paper passing control, the speed of transport of the second web W2 in the sheet manufacturing apparatus 100 is adjusted depending on the position of the leading edge of the second web W2 (step S26).

The control unit 150 temporarily moves (withdraws) the tension roller 88 in a direction away from the second web W2 by driving the roller moving unit 355 (step S27). The timing at which the tension roller 88 is withdrawn is a timing at which the leading edge of the second web W2 passes through the position of the tension roller 88, and preferably corresponds to a preset time including the moment at which the leading edge of the second web W2 passes through the position of the tension roller 88. After the second web W2 passes through the position of the tension roller 88, the control unit 150 returns the tension roller 88 to its original position, that is, the position at which a tensile force is exerted on the second web W2, by operating the roller moving unit 355. The tension roller 88 may be arranged at a location other than its position illustrated in FIG. 1, for example, between the heating rollers 84a and 84b and the cutting unit 90. In that case, the same withdrawing control as described above is executed in a case where the leading edge of the second web W2 passes through the position of the tension roller 88. In addition, the tension roller 88 may be arranged at a plurality of places.

In addition, in the leading edge paper passing control, the control unit 150 controls the nip pressure of the heating rollers 84a and 84b (step S28).

In the example illustrated in (s) in FIG. 7, at the time of start, the nip pressure of the heating rollers 84a and 84b is released by the nip pressure adjusting unit 353. After the leading edge of the second web W2 passes through the nip unit, the control unit 150 increases the nip pressure to a set pressure. The control unit 150 may not release the nip pressure at the time of start and may increase the nip pressure to a nip pressure (a nip pressure such that the leading edge of the second web W2 can easily pass through the nip unit) lower than the set nip pressure.

Then, the control unit 150 transitions to the normal operation of the sheet manufacturing apparatus 100 (step S28) and finishes the start sequence including the leading edge paper passing control.

Figure 8:
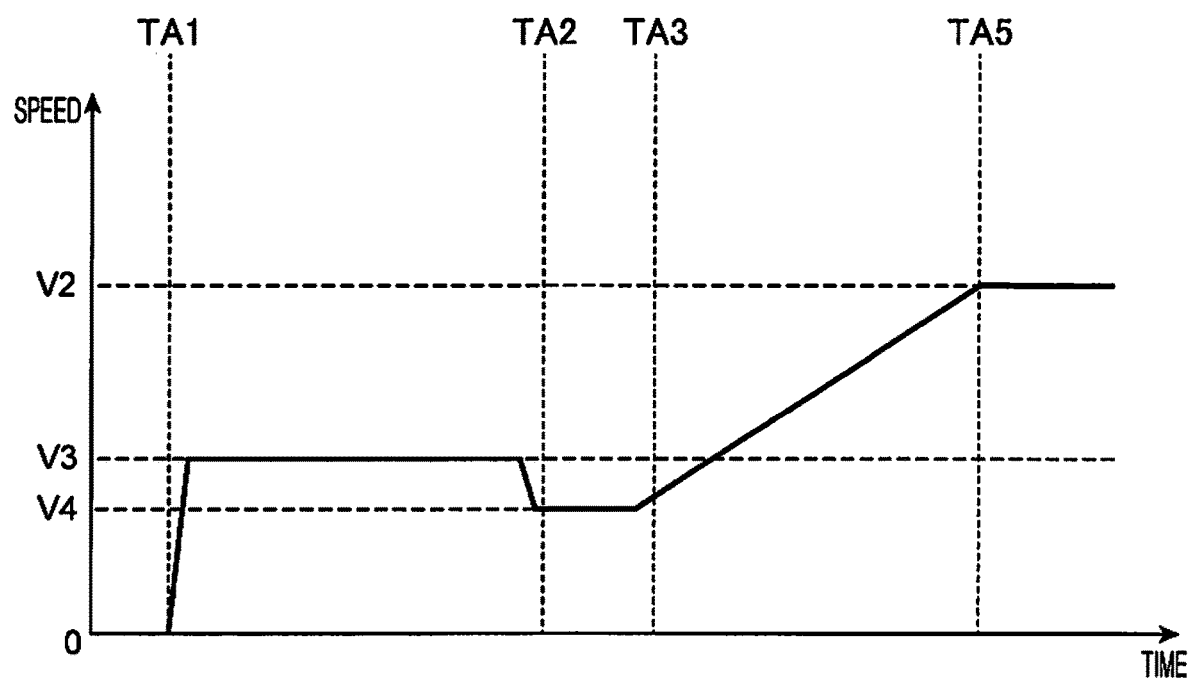
FIG. 8 is a descriptive diagram illustrating a leading edge paper passing control in the sheet manufacturing apparatus.

FIG. 8 is a descriptive diagram illustrating the leading edge paper passing control in the sheet manufacturing apparatus 100. In FIG. 8, a vertical axis denotes the transport speed of the second web W2, and a horizontal axis denotes an elapse of time. The left side of the drawing corresponds to the fact that the leading edge of the second web W2 is positioned on the upstream side in the transport direction of the second web W2. The right side of the drawing corresponds to the fact that the leading edge of the second web W2 is positioned on the downstream side in the transport direction.

Time TA1 in FIG. 8 denotes a time at which transport of the second web W2 is initiated. Time TA2 denotes a time before the leading edge of the second web W2 passes through the nip unit of the calender rollers 85. Time TA3 denotes a time after the leading edge of the second web W2 passes through the nip unit of the calender rollers 85. Time TA5 denotes a timing at which the leading edge of the second web W2 reaches the nip unit of the heating rollers 84a and 84b.

The control unit 150 controls the transport speed of the second web W2 by adjusting the movement speed of the mesh belt 72 by controlling the belt drive motor 333. In addition, the control unit 150 controls the movement speed of the mesh belt 79a to correspond to the moving speed of the mesh belt 72.

Furthermore, the control unit 150 sets the rotational speeds of the calender rollers 85 and the heating rollers 84a and 84b to correspond to the movement speed of the mesh belt 72 by controlling the heating unit drive motor 335 and the pressing unit drive motor 337. In such a manner, the transport speeds of the second web W2 and the sheet S that are transported through the second web forming unit 70, the transport unit 79, and the sheet forming unit 80 are appropriately controlled by the control unit 150. Thus, a cut or the like in the second web W2 caused by a difference in transport speed is prevented.

A speed V2 shown on the vertical axis in FIG. 8 is a speed at which the second web W2 is transported during the normal operation in the second web forming unit 70. In addition, a speed V3 is a speed of ½ of the speed V2, and a speed V4 is a speed of ⅓ of the speed V2.

While the leading edge of the second web W2 reaches the nip unit of the heating rollers 84a and 84b from the start of the belt drive motor 333 at time T14 in FIG. 6, the control unit 150 controls the transport speed of the second web W2 to be increased to the speed V2 as illustrated in FIG. 8.

Specifically, the control unit 150 performs a control for transport at the time speed V3 from initiation of transport of the second web W2 at time TA1 to time TA2 at which the leading edge of the second web W2 reaches a predetermined position in front of the nip unit of the calender rollers 85.

The speed V3 is a speed that is apparently lower than the speed V2 of the normal operation. Thus, as described above, on the leading edge of the second web W2, a sufficiently thick mixture is accumulated by the accumulating unit 60, and sufficient humidification is performed by the humidifying unit 208 and the humidifying unit 212.

The control unit 150 transports the second web W2 at the speed V4 from time TA2 to time TA3. The speed V4 is a speed that is further lower than the speed V3. The leading edge of the second web W2 passes through the nip unit of the calender rollers 85 at a low speed. Accordingly, the leading edge of the second web W2 can securely pass through the nip unit of the calender rollers 85.

After the leading edge of the second web W2 passes through the nip unit of the calender rollers 85 (time TA3), the control unit 150 increases the transport speed and sets the transport speed to the speed V1 of the normal operation until the leading edge reaches the nip unit of the heating rollers 84a and 84b. Thus, the leading edge of the second web W2 quickly passes through the nip unit of the heating rollers 84a and 84b. Accordingly, since the amount of time in which the leading edge of the second web W2 is heated by the heating rollers 84a and 84b is not large, the occurrence of winding, wrinkles, and distortions caused by heating the leading edge of the second web W2 can be inhibited.

The transport speed may be set to the speed V4 during a period of time TA1 to TA2. However, while the leading edge of the second web W2 is sufficiently away from the nip position of the calender rollers 85 or the heating rollers 84a and 84b, the amount of time required for the leading edge paper passing control is decreased as the transport speed of the second web W2 is increased. Accordingly, as illustrated in FIG. 8, it is preferable that transport be performed at a speed exceeding at least the speed V4 in a state where the leading edge of the second web W2 is away from the nip position, that is, before time TA2.

In addition, the transport speed may be changed stepwise in the course of increasing the transport speed of the second web W2 during a period of time TA3 to TA5. For example, the transport speed may be increased to the speed V3 from time TA3 and then, may be maintained at the speed V3 until a predetermined time between time TA3 and time TA5. Acceleration may also be performed in other manners, provided that the transport speed is equal to the speed V2 or a speed similar to the speed V2 at least a timing at which the leading edge of the second web W2 passes through the nip unit of the heating rollers 84a and 84b.

While the order in which the control unit 150 starts each drive unit of the sheet manufacturing apparatus 100 is illustrated as a flow in FIG. 5, it is not intended to limit execution of the flow control by the control unit 150 based on a single program. FIG. 5 to FIG. 7 illustrate the order or the manner in which the operating state of each drive unit changes as a result of control of the control unit 150, and a method of implementing such a control is not limited. For example, the control unit 150 may parallelly control a plurality of drive units or may control each drive unit in accordance with an independent control program. In addition, the control unit 150 may implement the operation in FIG. 5 to FIG. 7 by hardware control.

Figure 9:
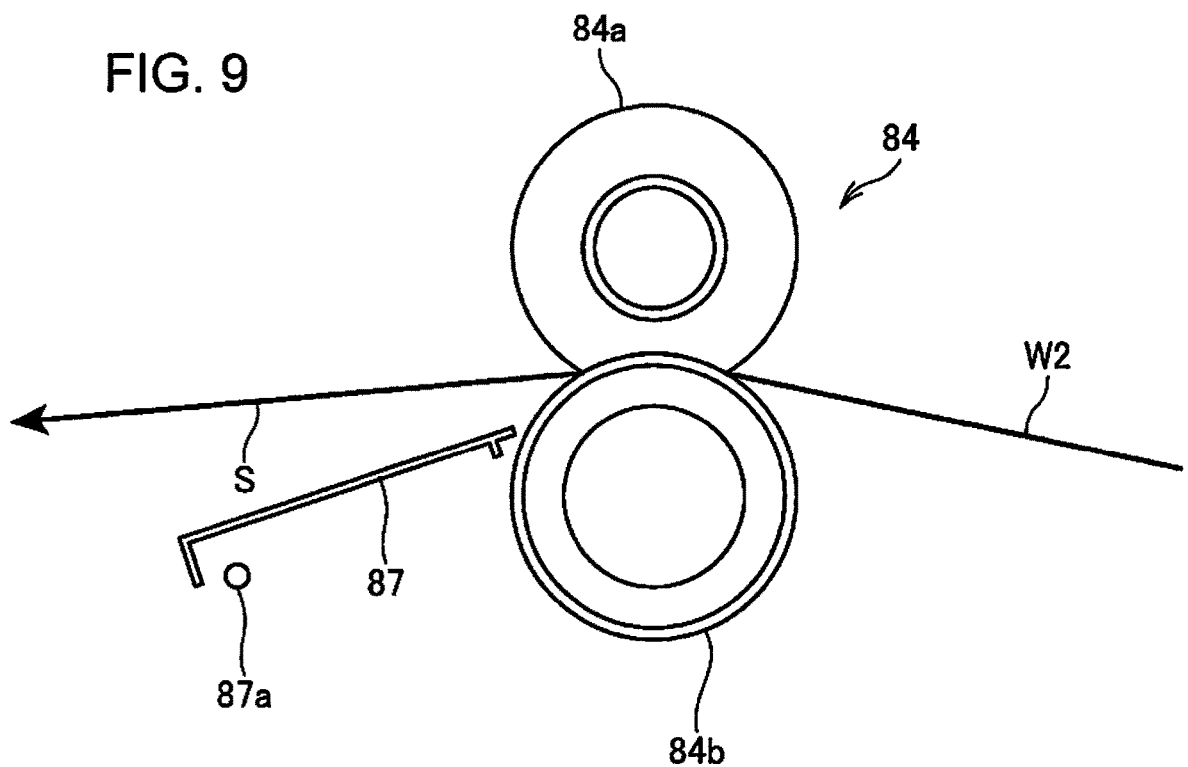
FIG. 9 is a descriptive diagram illustrating the operation of the sheet manufacturing apparatus.
Figure 10:
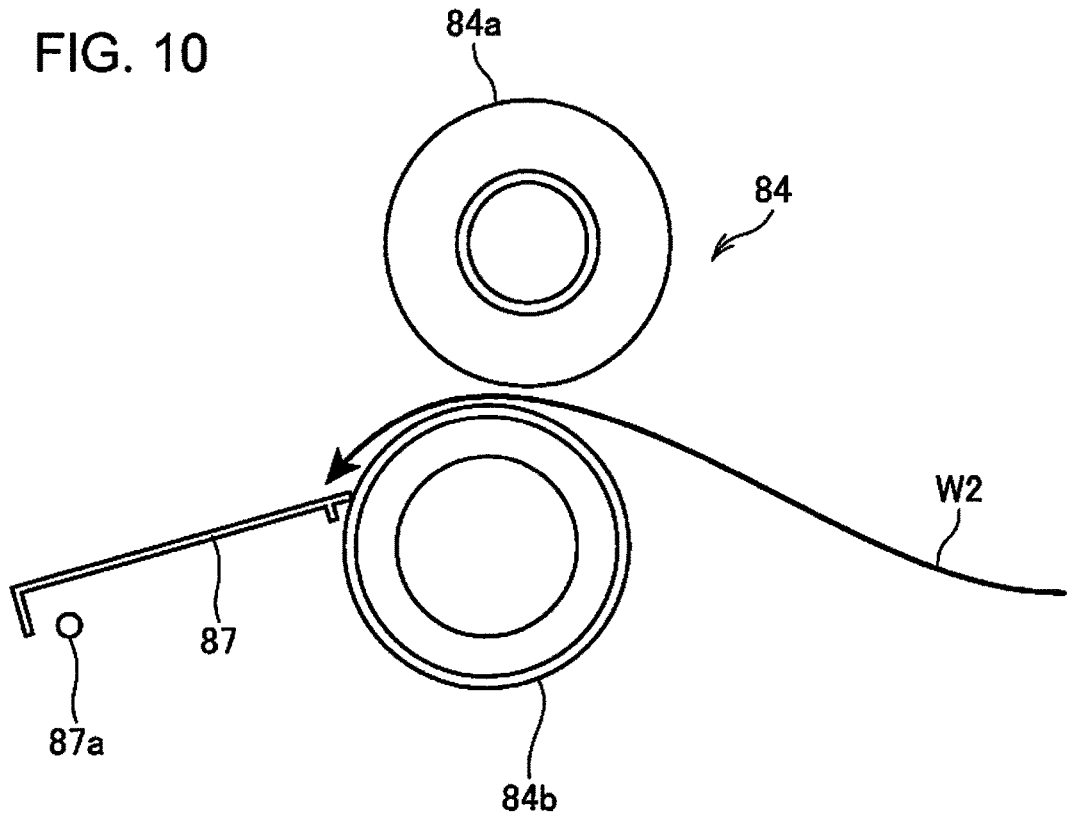
FIG. 10 is a descriptive diagram illustrating the operation of the sheet manufacturing apparatus.

FIG. 9 and FIG. 10 are descriptive diagrams illustrating the operation of the sheet manufacturing apparatus 100 and are side views illustrating an enlarged main part including the heating unit 84. FIG. 9 and FIG. 10 illustrate the operation in a case where the nip pressure of the heating rollers 84a and 84b is released. FIG. 9 illustrates a state where the nip pressure of the heating rollers 84a and 84b is increased, and FIG. 10 illustrates a state where nipping of the heating rollers 84a and 84b is released.

As illustrated in FIG. 9 and FIG. 10, the sheet manufacturing apparatus 100 includes a paper guide 87 downstream of the heating rollers 84a and 84b. The paper guide 87 is positioned downstream of the heating rollers 84a and 84b in the transport direction of the sheet S and can pivot about a fulcrum 87a as a center. In the present embodiment, the paper guide 87 is positioned below the sheet S with respect to a direction in which the sheet S heated by the heating rollers 84a and 84b is discharged. The left side of the drawing is the downstream side in the transport direction of the sheet S, and the cutting unit 90 (FIG. 1) is positioned in this direction.

The control unit 150 can control the increase and the release of the nip pressure of the heating rollers 84a and 84b and can control the position of the paper guide 87 with the fulcrum 87a as a center along with the increase and the release of the nip pressure. For example, a configuration in which an actuator or a motor, not illustrated, that pivots the paper guide 87 is driven in accordance with control of the control unit 150 may be used.

By pivoting the paper guide 87 about the fulcrum 87a as a center, the distance (gap distance) between the end portion of the paper guide 87 and the heating roller 84b can be changed.

As illustrated in FIG. 9, in a state where the heating rollers 84a and 84b are pressed, the paper guide 87 is at a position where the end portion of the paper guide 87 and the heating roller 84b have a gap of a predetermined distance or longer. In this case, the gap distance between the end portion of the paper guide 87 and the heating roller 84a is, for example, approximately 5 mm. Meanwhile, as illustrated in FIG. 10, in a state where the nip pressure of the heating rollers 84a and 84b is released, the paper guide 87 moves to a position close to the heating roller 84b. In this case, the gap distance between the end portion of the paper guide 87 and the heating roller 84b is, for example, approximately 0.1 mm. In the state illustrated in FIG. 10, the paper guide 87 and the heating roller 84a may be in contact with each other to an extent not affecting their functions.

The paper guide 87 guides the second web W2 in the course of transporting the leading edge of the second web W2 to the cutting unit 90 after the leading edge of the second web W2 passes through the nip unit of the heating rollers 84a and 84b that have released nipping. As illustrated in FIG. 10, after the leading edge of the second web W2 passes through the nip unit of the heating rollers 84a and 84b that have released nipping, the leading edge of the second web W2 can be securely mounted on the paper guide since the paper guide 87 is close to the heating roller 84b. Thus, in a state where the nip pressure of the heating rollers 84a and 84b is released, the leading edge of the second web W2 can be securely guided to the cutting unit 90.

As described with reference to the timing charts in FIG. 6 and FIG. 7, after the start of the sheet manufacturing apparatus 100, the control unit 150 sets a state where the nip pressure of the heating rollers 84a and 84b is released. The control unit 150 performs a control for applying the nip pressure after the leading edge of the second web W2 passes through the nip unit of the heating rollers 84a and 84b. Accordingly, after the start of the sheet manufacturing apparatus 100, a change to the state in FIG. 9 from the state illustrated in FIG. 10 is made by control of the control unit 150.

In the state illustrated in FIG. 9, the heating rollers 84a and 84b are heated. Thus, at least any or both of the heating rollers 84a and 84b thermally expand. In order to prevent the paper guide 87 from interfering with the heating rollers 84a and 84b due to thermal expansion of the heating rollers 84a and 84b, the paper guide 87 and the heating roller 84b are separated by control of the control unit 150. Accordingly, the paper guide 87 does not hinder the operation of the heating unit 84, and the sheet S can be stably transported.

As described above, the sheet manufacturing apparatus 100 to which the present invention is applied includes the second web forming unit 70 as a processing unit that processes fibers into a web shape, and the sheet forming unit 80 that pinches and transports the second web W2 which is processed matter processed into a web shape by the second web forming unit 70. The sheet manufacturing apparatus 100 includes the control unit 150 that controls at least any of a pressing state and a transport state in the sheet forming unit 80. The control unit 150 causes the processed matter to pass through the nip unit by controlling at least any of the transport speed of the sheet forming unit 80, the nip pressure of the sheet forming unit 80, and the nip width of the sheet forming unit 80 depending on the position of the leading edge of the second web W2 with respect to the nip unit in which the sheet forming unit 80 pinches the second web W2. That is, the control unit 150 executes the leading edge paper passing control depending on the position of the leading edge of the second web W2 compressed by the calender rollers 85 with respect to the nip unit (in the present embodiment, the nip position of the heating rollers 84a and 84b) of the sheet forming unit 80. In the leading edge paper passing control, the control unit 150 controls at least any of the transport speed of each unit including the heating rollers 84a and 84b, the nip pressure of the heating rollers 84a and 84b, and the nip width NW of the heating rollers 84a and 84b.

A nip unit of the present invention corresponds to the nip unit of the heating rollers 84a and 84b and can also correspond to the nip unit of the calender rollers 85.

According to the sheet manufacturing apparatus 100 and a control method for the sheet manufacturing apparatus 100, the leading edge of the second web W2 can smoothly pass through the nip unit of the heating rollers 84a and 84b in a case where manufacturing of the sheet S is initiated. Thus, the occurrence of a jam in the manufacturing step of the sheet S can be inhibited.

In addition, the second web forming unit 70 as the processing unit transports the second web W2 at a speed corresponding to a transport speed at which the second web W2 is transported in the sheet forming unit 80. Accordingly, the second web forming unit 70 and the heating rollers 84a and 84b transport the second web W2 at a corresponding speed. Thus, the occurrence of a jam caused by a difference in transport speed can be more effectively inhibited in the manufacturing step of the sheet S.

In addition, the second web forming unit 70 as the processing unit includes the mesh belt 72 that transfers the second web W2 to the sheet forming unit 80 based on control of the control unit 150. The control unit 150 transfers the second web W2 at a first speed (speed V2) at the time of the normal operation and transfers the second web W2 at a second speed (speed V3) that is a speed lower than the first speed, in a case where the leading edge enters the nip unit. Thus, the second web W2 is sent to the nip unit of the sheet forming unit 80 (particularly, the nip unit of the calender rollers 85) at a low speed in a case where manufacturing of the sheet S is initiated, and the second web W2 can smoothly pass through the nip unit. That is, the second web W2 can be be prevented from being wound onto the calender rollers 85. In addition, at the time of the normal operation of manufacturing the sheet S, the processed matter of the second web W2 is transported at the speed V2 of a higher speed. Thus, manufacturing efficiency can be increased. Accordingly, a decrease in the manufacturing efficiency of the sheet S can be inhibited, and a jam in the manufacturing step of the sheet S can be inhibited.

In addition, in a case where the leading edge of the second web W2 is away by a predetermined distance or longer from the nip unit of the calender rollers 85 or the nip unit of the heating rollers 84a and 84b, the control unit 150 causes the mesh belt 72 to transfer the second web W2 at a higher speed than the second speed (speed V3). Accordingly, by increasing the transport speed while the leading edge of the second web W2 is not in contact with the nip unit, the manufacturing efficiency of the sheet S can be increased.

In addition, the sheet manufacturing apparatus 100 includes the tension roller 88 that imparts a tensile force to the second web W2. The control unit 150 separates the tension roller 88 from the processed matter depending on the position of the leading edge of the second web W2. Accordingly, in a case where the leading edge of the second web W2 moves, the second web W2 can securely pass through the nip unit by separating the tension roller 88. In addition, at the time of the normal operation of manufacturing the sheet S, looseness of the second web W2 can be removed by the tension roller 88, and the occurrence of a jam can be effectively inhibited.

In addition, the sheet forming unit 80 includes the heating rollers 84a and 84b that heats the second web W2. Accordingly, a state where a jam does not easily occur can be implemented by adjusting the transport speed, the nip pressure, the nip width, or the like of the heating rollers 84a and 84b.

In addition, the heating unit 84 includes the heating rollers 84a and 84b as a pair. At least one of the heating rollers 84a and 84b has elasticity, and its nip width changes depending on the nip pressure. Accordingly, the nip width in the heating unit 84 can be adjusted by adjusting the nip pressure. Accordingly, the nip width can be easily adjusted, and a phenomenon in which the leading edge of the second web W2 is wound onto the roller can be prevented. The occurrence of a jam can be effectively inhibited.

In addition, in the sheet manufacturing apparatus 100, the nip pressure of the heating rollers 84a and 84b can be adjusted by control of the control unit 150. Thus, the occurrence of a jam can be inhibited by adjusting the nip pressure and the nip width of the heating rollers 84a and 84b.

In addition, the sheet manufacturing apparatus 100 further includes the paper guide 87 on the downstream side of the heating rollers 84a and 84b in the transport direction of the second web W2. The control unit 150 controls the gap distance between the paper guide 87 and the heating rollers 84a and 84b depending on the position of the leading edge of the second web W2. Thus, in a case where the heating rollers 84a and 84b expand along with an increase in temperature, interference of the heating rollers 84a and 84b with the paper guide 87 can be prevented.

In addition, the sheet manufacturing apparatus 100 includes, as the processing unit, the defibrating unit 20 that defibrates the raw material including fibers, and the mixing unit 50 that mixes fibers included in the defibrated matter defibrated by the defibrating unit 20 with resin. In addition, the sheet manufacturing apparatus 100 includes, as the processing unit, the second web forming unit 70 that forms a web by accumulating the mixture mixed by the mixing unit 50. The sheet manufacturing apparatus 100 transfers the second web W2 as the processed matter toward the sheet forming unit 80 and sets the amount of the additive (resin) included in the part within the predetermined distance from the leading edge of the second web W2 to be smaller than the amount of resin in other parts in the second web W2 based on control of the control unit 150. Accordingly, winding, wrinkles, and distortions that occur in a case where the leading edge of the second web W2 is heated by the heating unit 84 can be inhibited. Accordingly, the occurrence of a jam can be effectively inhibited.

In addition, the defibrating unit 20 defibrates the raw material in the atmosphere, and the mixing unit 50 mixes fibers with resin in the atmosphere. The second web forming unit 70 includes the mesh belt 72 and forms the second web W2 by dropping and accumulating the mixture onto the mesh belt 72. The sheet forming unit 80 forms the sheet S by pressing and heating the second web W2. Accordingly, in a dry type manufacturing apparatus for the sheet S that manufactures the sheet S by defibrating the raw material in the atmosphere and mixing the defibrated matter with resin in the atmosphere, the occurrence of a jam in a case where the leading edge of the second web W2 passes through the nip unit can be inhibited.

The embodiment is merely a specific manner of embodying the present invention disclosed in the claims and does not limit the present invention. Not all configurations described in the embodiment are necessarily essential constituents of the present invention. In addition, the invention is not limited to the configuration of the embodiment and can be embodied in various manners without departing from its nature.

The sheet manufacturing apparatus 100 may be configured to manufacture not only the sheet S but also a hard sheet, a board shape configured with stacked sheets, or manufactured matter having a web shape. In addition, the sheet S may be paper made of pulp or old paper as the raw material or may be non-woven fabric including natural fibers or fibers made of synthetic resin. In addition, the properties of the sheet S are not particularly limited. The sheet S may be paper that can be used as recording paper (for example, so-called PPC paper) for the purpose of writing or printing or may be wallpaper, wrapping paper, color paper, drawing paper, Kent paper, or the like. In addition, in a case where the sheet S is non-woven fabric, the sheet S may be not only general non-woven fabric but also a fiber board, tissue paper, kitchen paper, a cleaner, a filter, a liquid absorbing material, a sound absorbing body, a shock absorbing material, a mat, or the like.

In addition, while the embodiment illustrates a configuration in which the sheet S is cut by the cutting unit 90, a configuration in which the sheet S processed by the sheet forming unit 80 is wound and picked up by a winding pick-up roller may be used.

In addition, at least a part of each function block illustrated in FIG. 2, FIG. 4, and the like may be implemented by hardware or may be configured to be implemented by cooperation between hardware and software and is not limited to a configuration in which independent hardware resources are arranged as illustrated in the drawings. In addition, the program executed by the control unit may be stored in the non-volatile storage unit or other storage devices (not illustrated). In addition, a configuration in which the program stored in an external device is executed by acquiring the program through a communication unit may be used.

REFERENCE SIGNS LIST 2, 3, 7, 8, 23, 29 PIPE
9 CHUTE
10 SUPPLY UNIT
12 GRINDING UNIT
14 GRINDING BLADE
20 DEFIBRATING UNIT
22 INTRODUCTION PORT
24 DISCHARGE PORT
26 DEFIBRATING UNIT BLOWER
27 DUST COLLECTING UNIT
28 CAPTURING BLOWER
40 SELECTING UNIT
41 DRUM UNIT
42 INTRODUCTION PORT
43 HOUSING UNIT
45 FIRST WEB FORMING UNIT
46 MESH BELT
47 STRETCHING ROLLER
48 DRAWING UNIT
49 ROTATING BODY
50 MIXING UNIT
52 ADDITIVE SUPPLY UNIT
52a DISCHARGE UNIT
54 PIPE
56 MIXING BLOWER
60 ACCUMULATING UNIT
61 DRUM UNIT
62 INTRODUCTION PORT
63 HOUSING UNIT
70 SECOND WEB FORMING UNIT (WEB FORMING UNIT)
72 MESH BELT (TRANSFER UNIT)
74 STRETCHING ROLLER
76 SUCTION MECHANISM
77 SUCTION BLOWER
79 TRANSPORT UNIT
79a MESH BELT
79b STRETCHING ROLLER
79c SUCTION MECHANISM
79d INTERMEDIATE BLOWER
80 SHEET FORMING UNIT (ROLLER UNIT)
82 PRESSING UNIT
84 HEATING UNIT (HEATING ROLLER)
84a, 84b HEATING ROLLER (ROLLER)

85 CALENDER ROLLER (ROLLER)
87 PAPER GUIDE
90 CUTTING UNIT
92 FIRST CUTTING UNIT
94 SECOND CUTTING UNIT
96 DISCHARGE UNIT
100 SHEET MANUFACTURING APPARATUS
110 CONTROL DEVICE
140 STORAGE UNIT
150 CONTROL UNIT
202, 204, 206, 208, 210, 212 HUMIDIFYING UNIT
301 OLD PAPER REMAINING AMOUNT SENSOR
302 ADDITIVE REMAINING AMOUNT SENSOR
303 PAPER DISCHARGE SENSOR
304 WATER AMOUNT SENSOR
305 TEMPERATURE SENSOR
306 AIR AMOUNT SENSOR
307 AIR SPEED SENSOR
311 GRINDING UNIT DRIVE MOTOR
313 DEFIBRATING UNIT DRIVE MOTOR
315 PAPER FEEDING MOTOR
319 ADDITIVE SUPPLY MOTOR
325 DRUM DRIVE MOTOR
327 BELT DRIVE MOTOR
329 DIVIDING UNIT DRIVE MOTOR
331 DRUM DRIVE MOTOR
333 BELT DRIVE MOTOR
335 HEATING UNIT DRIVE MOTOR
337 PRESSING UNIT DRIVE MOTOR
341 ROLLER HEATING UNIT
343 VAPORIZATION TYPE HUMIDIFIER
345 MIST TYPE HUMIDIFIER
349 WATER SUPPLY PUMP
351 CUTTING UNIT DRIVE MOTOR
353 NIP PRESSURE ADJUSTING UNIT
355 ROLLER MOVING UNIT
372 TO 394 DRIVE IC

The invention claimed is:

1. A sheet manufacturing apparatus comprising:
a processing unit that processes fibers into a web;
a roller unit that pinches and transports the web into which the fibers are processed by the processing unit; and
a control unit that controls at least any of a pressing state and a transport state in the roller unit,
wherein the control unit causes the web to pass in a nip unit by controlling at least any of a transport speed of the roller unit, a nip pressure of the roller unit, and a nip width of the roller unit depending on a position of a leading edge of the web with respect to the nip unit in which the roller unit pinches the web.

2. The sheet manufacturing apparatus according to claim 1,
wherein the processing unit transports the web at a speed corresponding to the transport speed at which the web is transported in the roller unit.

3. The sheet manufacturing apparatus according to claim 1,
wherein the processing unit includes a transfer unit that transfers the web to the roller unit based on control of the control unit, and
the control unit transfers, by the transfer unit, the web at a first speed at a time of a normal operation and transfers the web at a second speed that is a speed lower than the first speed, in a case where the leading edge of the web enters the nip unit.

4. The sheet manufacturing apparatus according to claim 3,
wherein the control unit transfers the web at a speed higher than the second speed by the transfer unit in a case where the leading edge of the web is away by a predetermined distance or longer from the nip unit.

5. The sheet manufacturing apparatus according to claim 1, further comprising:
a tension roller that imparts a tensile force to the web,
wherein the control unit separates the tension roller from the web depending on the position of the leading edge of the web.

6. The sheet manufacturing apparatus according to claim 1,
wherein the roller unit includes a heating roller that heats the web.

7. The sheet manufacturing apparatus according to claim 6,
wherein the heating roller includes rollers as a pair, and at least one of the rollers has elasticity and has a nip width that changes depending on a nip pressure.

8. The sheet manufacturing apparatus according to claim 7,
wherein the nip pressure of the heating roller is adjustable by control of the control unit.

9. The sheet manufacturing apparatus according to claim 8, further comprising:
a paper guide on a downstream side of the heating roller in a transport direction of the web,
wherein the control unit controls a gap distance between the paper guide and the heating roller depending on the position of the leading edge of the web.

10. The sheet manufacturing apparatus according to claim 6,
wherein the processing unit includes
a defibrating unit that defibrates a raw material including the fibers,
a mixing unit that mixes the fibers included in defibrated matter defibrated by the defibrating unit with resin, and
a web forming unit that forms the web by accumulating a mixture mixed by the mixing unit,
transfers the web toward the roller unit, and
sets an amount of the resin included in a part within a predetermined distance from the leading edge of the web to be smaller than the amount of the resin in other parts in the web based on control of the control unit.

11. The sheet manufacturing apparatus according to claim 10,
wherein the defibrating unit defibrates the raw material in an atmosphere,
the mixing unit mixes the fibers with the resin in the atmosphere,
the web forming unit includes a mesh belt and forms the web by dropping and accumulating the mixture on the mesh belt, and
the roller unit forms a sheet by pressing and heating the web.

12. A control method for controlling a sheet manufacturing apparatus,
the sheet manufacturing apparatus including
a processing unit that processes fibers into a web, and
a roller unit that pinches and transports the web into which the fibers are processed by the processing unit,
wherein a control unit causes the web to pass in a nip unit by controlling at least any of a transport speed of the roller unit, a nip pressure of the roller unit, and a nip width of the roller unit depending on a position of a leading edge of the web with respect to the nip unit in which the roller unit pinches the web.

\* \* \* \* \*